United States Patent [19]

Chauvette

[11] 3,917,587

[45] Nov. 4, 1975

[54] CEPHALOSPORIN ETHERS

[75] Inventor: Robert R. Chauvette, Indianapolis, Ind.

[73] Assignee: Eli Lilly and Company, Indianapolis, Ind.

[22] Filed: Nov. 28, 1972

[21] Appl. No.: 310,191

[52] U.S. Cl. ............................ 260/243 C; 424/246
[51] Int. Cl.² ............... C07D 501/18; C07D 501/20
[58] Field of Search ............................... 260/243 C

[56] References Cited
UNITED STATES PATENTS

| | | | |
|---|---|---|---|
| 3,665,003 | 5/1972 | Kennedy et al. | 260/243 C |
| 3,668,203 | 6/1972 | Clark et al. | 260/243 C |

Primary Examiner—Nicholas S. Rizzo
Attorney, Agent, or Firm—William B. Scanlon; Everet F. Smith

[57] ABSTRACT

7-Acylamido-, and 7-amino-3-alkoxy-3-cephem-4-carboxylic acids are prepared by reacting a 7-acylamido-, or 7-amino-3-methylenecepham-4-carboxylic acid ester with ozone, and decomposing the ozonide which is formed to provide an intermediate 7-acylamido-, or 7-amino-3-hydroxy-3-cephem-4-carboxylic acid ester. Reaction of the 3-hydroxy-3-cephem with a diazoalkane followed by removal of the ester group provides a compound of the invention. The 3-alkoxy-3-cephem acids are valuable antibiotic compounds.

30 Claims, No Drawings

CEPHALOSPORIN ETHERS

BACKGROUND OF THE INVENTION

This invention relates to the cephalosporin class of antibiotics. In particular, it relates to cephalosporin ethers and 3-hydroxy cephalosporins represented by the following general formula

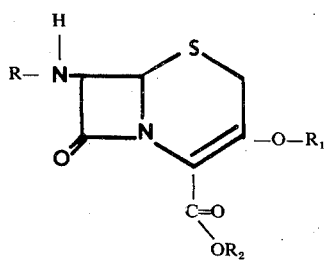

wherein R is hydrogen or an acyl group derived from a carboxylic acid, $R_1$ is hydrogen, methyl, ethyl, 3-methyl-2-butenyl or diphenylmethyl, and $R_2$ is hydrogen or an ester forming group.

Previously, numerous antibiotics of the cephalosporin class have been described. These antibiotics, all having the same basic ring structure comprising the 4-membered β-lactam ring fused to a 6-membered dihydrothiazine ring, differ from one another structurally and biologically in many respects. Structurally, the known cephalosporin antibiotics differ in the nature of the 7-acylamido substituent and also in the nature of the substituent in the 3-position of the dihydrothiazine ring. The cephalosporanic acids, for example, cephalothin, are characterized by an acetoxymethyl group in the 3-position. The deacetoxycephalosporanic acids, for example, cephalexin, have a 3-methyl substituent. Numerous cephalosporins having a substituted methyl group in the 3-position have also been described. The desacetyl cephalosporins have a 3-hydroxymethyl substituent and 3-alkylthiomethylcephalosporins have also been described. Recently, certain 3-methoxymethyl-cephalosporins have been disclosed in U.S. Pat. No. 3,665,003.

Also, certain 7-acylamido-3-cephem-4-carboxylic acids wherein the 3-position of the dihydrothiazine ring bears only a hydrogen atom have been described.

The present invention provides cephalosporin antibiotic compounds of the above formula wherein an ether group is attached directly to the 3-position of the dihydrothiazine ring.

SUMMARY

7-Acylamido-, or 7-amino-3-methylenecepham-4-carboxylic acid esters are reacted with ozone to form an intermediate ozonide involving the 3-exomethylene moiety. Decomposition of the ozonide provides, 7-acylamido-, or 7-amino-3-hydroxy-3-cephem-4-carboxylic acid esters as illustrated by the following reaction scheme:

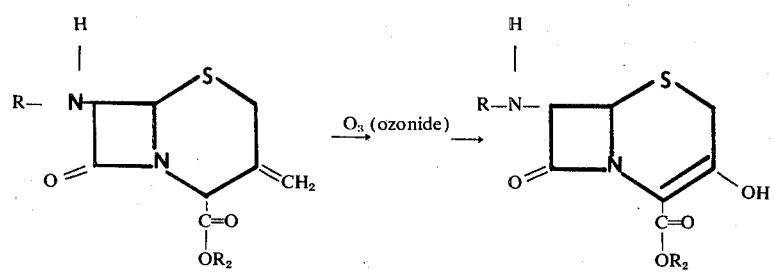

wherein R is as described above, and $R_2$ is an ester forming group.

The 3-hydroxy-3-cephem ester is then reacted for example, with diazomethane or diazoethane to yield a 3-methoxy- or a 3-ethoxy-3-cephem-4-carboxylic acid ester or an alkoxy nucleus ester, a 7-amino-3-alkoxy-3-cephem-4-carboxylic acid ester. The latter compound is acylated by known procedures with the desired derivative of a carboxylic acid to provide, alternatively, a 7-acylamido-3-alkoxy-3-cephem-4-carboxylic acid ester. Removal of the carboxylic acid protecting ester group, $R_2$, provides the antibiotic compound wherein R is acyl and $R_2$ is hydrogen.

In a further alternative method of preparing the compounds of the invention, the 7-amino-3-hydroxy-3-cephem-4-carboxylic acid ester obtained by the ozonolysis of the 3-exomethylene nucleus can be acylated according to known procedures to provide the 7-acylamido-3-hydroxy-3-cephem-4-carboxylic acid ester. The acylated 3-hydroxy-3-cephem ester is then reacted with a diazoalkane to provide, following removal of the ester group $R_2$, the cephalosporin ether compound of the invention.

The cephalosporin ethers provided by this invention are useful antibiotic substances which can be employed to combat infections caused by gram-positive and gram-negative microorganisms.

DETAILED DESCRIPTION

The cephalosporin compounds of this invention are represented by the following Formula I

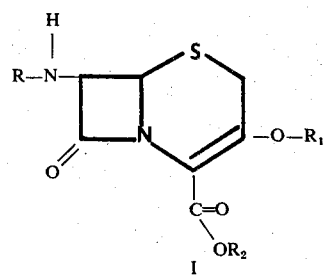

wherein R is hydrogen, or an acyl group of the formula

wherein R' is a. $C_1$-$C_7$ alkyl, $C_3$-$C_7$ alkenyl, cyanomethyl, halomethyl, 4-amino-4-carboxybutyl, 4-protected amino-4-carboxybutyl; or
b. the group R'' wherein R'' is 1,4-cyclohexyldienyl, phenyl, or phenyl substituted by halogen, hydroxy, nitro, amino, cyano, $C_1$-$C_4$ lower alkyl, $C_1$-$C_4$ lower alkoxy, hydroxymethyl, aminomethyl, protected aminomethyl, carboxy or carboxymethyl; or
c. an arylalkyl group of the formula R''—(Y)$_m$—CH$_2$— wherein
R'' is as defined above,
Y is O or S,
m is 0 or 1; or
d. a substituted arylalkyl group of the formula

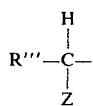

wherein R''' is R'' as defined above, 2-thienyl or 3-thienyl, Z is hydroxy or protected hydroxy; or
e. a heteroarylmethyl group of the formula R''''λ'—CH$_2$— wherein
R'''' is 2-thienyl, 3-thienyl, 2-furyl, 3-furyl, 2-thiazyl, 2-oxazyl, 5-tetrazyl or 1-tetrazyl;
and wherein $R_1$ is hydrogen, methyl, ethyl, 3-methyl-2-butenyl or diphenylmethyl; and
$R_2$ is hydrogen or a carboxylic acid protecting ester forming group; with the limitation that when $R_1$ is hydrogen, $R_2$ is a carboxylic acid protecting ester forming group.

The terms employed in the foregoing definition of the compounds of the invention have the following meanings when employed herein. The term, "$C_1$-$C_7$ alkyl," refers to methyl, ethyl, n-propyl, n-butyl, iso-butyl, n-hexyl, n-heptyl and like aliphatic hydrocarbon chains. "$C_3$-$C_7$ alkenyl" has reference to the unsaturated hydrocarbon chains such as propenyl (allyl), butenyl, pentenyl, hexenyl, heptenyl and the like. "Halomethyl" refers to chloromethyl or bromomethyl.

When in the above definition R'' represents a substituted phenyl group, R'' can be a mono or disubstituted halophenyl group such as 4-chlorophenyl, 2,6-dichlorophenyl, 2,4-dichlorophenyl, 3,4-dichlorophenyl, 3-chlorophenyl, 3-bromophenyl, 4-bromophenyl, 3,4-dibromophenyl, 4-fluorophenyl, 2-fluorophenyl and the like; a mono or dihydroxyphenyl group such as 4-hydroxyphenyl, 3-hydroxyphenyl, 2,4-dihydroxyphenyl and the like; a mononitrophenyl group such as 3- or 4-nitrophenyl; a monoaminophenyl group such as 4-aminophenyl, 3-aminophenyl or 2-aminophenyl; a cyanophenyl group, for example, 4-cyanophenyl; a mono or disubstituted lower alkylphenyl group such as 4-methylphenyl, 2,4-dimethylphenyl, 2-methylphenyl, 4-isopropylphenyl, 4-ethylphenyl, 3-n-propylphenyl and the like; a mono or disubstituted lower alkyl phenyl ether for example, 2,6-dimethoxyphenyl, 4-methoxyphenyl, 3-ethoxyphenyl, 4-isopropoxyphenyl, 4-t-butoxyphenyl, 3-ethoxy-4-methoxyphenyl and the like; an aminomethylphenyl group such as 3- or 4-aminomethylphenyl; a carboxyphenyl group such as 3- or 4-carboxyphenyl; or R'' represents a carboxymethylphenyl group such as a 3- or 4-carboxymethylphenyl group. Also, R'' represents disubstituted phenyl groups wherein the substituents can be different for example, 3-methyl-4-hydroxyphenyl, 3-chloro-4-hydroxyphenyl, 2-methoxy-4-bromophenyl, 4-ethyl-2-hydroxyphenyl, 3-hydroxy-4-nitrophenyl, 2-hydroxy-4-carboxyphenyl and like disubstituted phenyl groups bearing different substituents.

The term, "protected amino" as employed in the above definition has reference to an amino group substituted with one of the commonly employed amino blocking groups such as the t-butyloxycarbonyl group (t-BOC); the benzyloxycarbonyl group, the p-methoxybenzyloxycarbonyl group, the p-nitrobenzyloxycarbonyl group, the 2,2,2-trichloroethyloxycarbonyl group, the 1-carbomethoxy-2-propenyl group formed with methyl acetoacetate, the trimethylsilyl group, and like amino protecting groups. When in the Formula I, R' is the 4-amino-4-carboxybutyl group, then in addition to the above amino protecting groups the chloroacetyl, propionyl and 2,4-dichlorobenzoyl groups can be employed to advantage in protecting the amino group thereof.

The term "protected hydroxy" has reference to the readily cleavable groups fromed with an hydroxyl group such as the formyloxy group, the chloroacetoxy group, the benzhydryloxy group, the trityloxy group, the p-nitrobenzyloxy group, the trimethylsilyl group, and the like.

Illustrative of the acyl groups,

as defined above are acetyl, propionyl, butyryl, hexanoyl, heptanoyl, 2-pentenoyl, acryloyl, 5-aminoadipoyl, chloroacetyl, bromoacetyl and the like.

Representative of the acyl groups

are benzoyl, 2,6-dimethoxybenzoyl, 4-chlorobenzoyl, 4-methylbenzoyl, 3,4-dichlorobenzoyl, 4-cyanobenzoyl, 3-bromobenzoyl, 3-aminobenzoyl, 4-nitrobenzoyl and the like.

Illustrative of the acyl groups

when R' is a group of the formula R''-(Y)$_m$—CH$_2$— and m is 0, are cyclohexa-1,4-diene-1-acetyl, phenylacetyl, 4-chlorophenylacetyl, 3-hydroxyphenylacetyl, 4-carboxyphenylacetyl, 3-cyanophenylacetyl, 4-aminophenylacetyl, 4-hydroxy-3-methylphenylacetyl, 4-bromophenylacetyl, 4-ethoxyphenylacetyl, 4-nitrophenylacetyl, 3,4-dimethoxyphenylacetyl and the like; and when m is 1 and Y is O, representative acyl groups are phenoxyacetyl, 3-hydroxyphenoxyacetyl, 4-chlorophenoxyacetyl, 3,4-dichlorophenoxyacetyl, 2-chlorophenoxyacetyl, 4-methoxyphenoxyacetyl, 3-aminophenoxyacetyl, 4-carboxymethylphenoxyacetyl, 4-aminoethylphenoxyacetyl, 2-ethoxyphenoxyacetyl, 3,4-dimethylphenoxyacetyl, 4-isopropylphenoxyacetyl, 3-cyanophenoxyacetyl, 3-nitrophenoxyacetyl and like substituted phenoxyacetyl groups; and when m is 1 and Y is S, representative thiophenoxyacetyl groups are thiophenoxyacetyl, 2,6-dichlorothiophenoxyacetyl, 4- chlorothiophenoxyacetyl, 4-cyanothiophenoxyacetyl, 3-bromothiophenoxyacetyl, 3-aminothiophenoxyacetyl and like acyl groups.

Illustrative of the acyl groups when R' is a substituted arylalkyl group of the formula

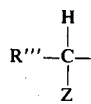

are the hydroxy substituted arylalkyl groups such as the mandeloyl group of the formula

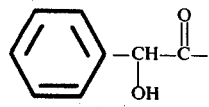

and the substituted mandeloyl groups, for example, 4-methoxymandeloyl, 4-hydroxymandeloyl, 3,4-dichloromandeloyl, 3-cyanomandeloyl, 3-bromomandeloyl, 3-hydroxymandeloyl, 4-aminomandeloyl, 3-nitromandeloyl, 4-fluoromandeloyl, 4-carboxymandeloyl, 4-carboxymethylmandeloyl, 4-aminomethylmandeloyl, and the like; or such groups as

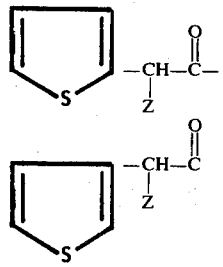

Representative of the acyl group

when R' is a heteroarylmethyl group of the formula R'λ"—$CH_2$— are, 2-thienylacetyl, 3-thienylacetyl, 2-furylacetyl, a 2-oxazylacetyl group of the fromula

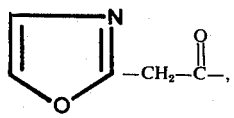

a 2-thiazylacetyl group of the formula

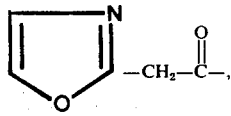

or a 1-tetrazylacetyl group of the formula

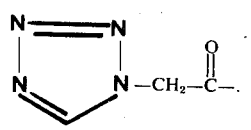

The cephalosporin ethers defined above, can be prepared by a diversity of synthetic routes. The starting material in each instance is a 3-exomethylenecepham-4-carboxylic acid ester. These starting materials are prepared and described in my copending application Ser. No. 118,941, filed Feb. 25, 1971. As described therein, a 7-acylamidocephalosporanic acid is reacted with a sulfur containing nucleophile according to known procedures to effect the nucleophilic displacement of the acetoxy group of the cephalosporanic acid and provide a 7-acylamido-3-thiosubstituted methyl-3-cephem-4-carboxylic acid. The 3-thiosubstituted cephem product is then reduced with hydrogen in the presence of Raney nickel or with zinc/formic acid in the presence of dimethylformamide to produce the 3-exomethylenecepham acid. For example, 7-phenylacetamidocephalosporanic acid is reacted with potassium ethyl xanthate to yield 7-phenylacetamido-3-ethoxythionocarbonylthiomethyl-3-cephem-4-carboxylic acid which on reduction with zinc/formic acid in the presence of DMF yields, 7-phenylacetamido-3-exomethylenecepham-4-carboxylic acid of the formula

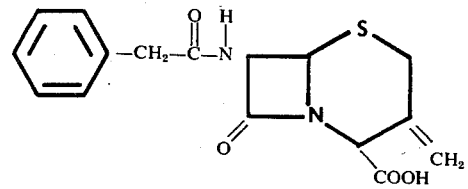

Likewise, there is described the 3-exomethylenecepham nucleus of the formula

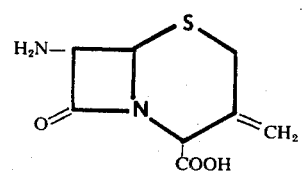

which can be prepared by reacting a 7-acylamido-3-exomethylenecepham-4-carboxylic acid ester with phosphorus pentachloride ($PCl_5$) in the presence of pyridine to obtain the intermediate imino chloride. The imino chloride is reacted with methanol in the cold to afford the imino ether. The imino ether readily undergoes hydrolysis to provide the 7-amino-3-exomethylenecepham-4-carboxylic acid ester. The ester group is then removed to yield the 3-exomethylenecepham nucleus.

According to the present invention, either a 7-acylamido-3-exomethylenecepham-4-carboxylic acid ester or an ester of the 3-exomethylenecepham nucleus is reacted with ozone to form an intermediate ozonide which on decomposition yields the corresponding 3-hydroxy-3-cephem-4-carboxylic acid ester as illustrated by the following general reaction scheme.

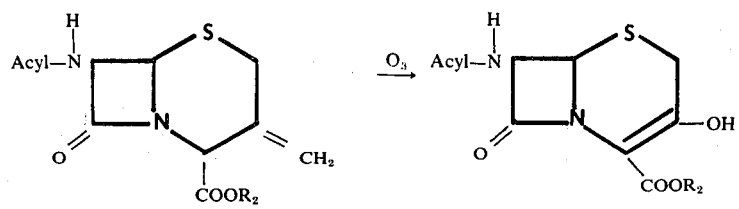

(1)

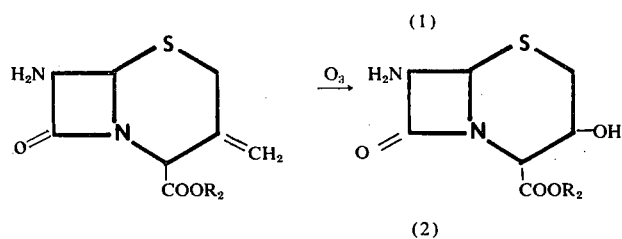

(2)

The 7-acylamido-3-hydroxy-3-cephem ester (1) or the 3-hydroxy nucleus ester (2) is then reacted with diazomethane, diazoethane, diphenyldiazomethane, or 1-diazo-3-methyl-2-butene to provide the corresponding ether compound of the invention as illustrated with diazomethane in the following reaction scheme.

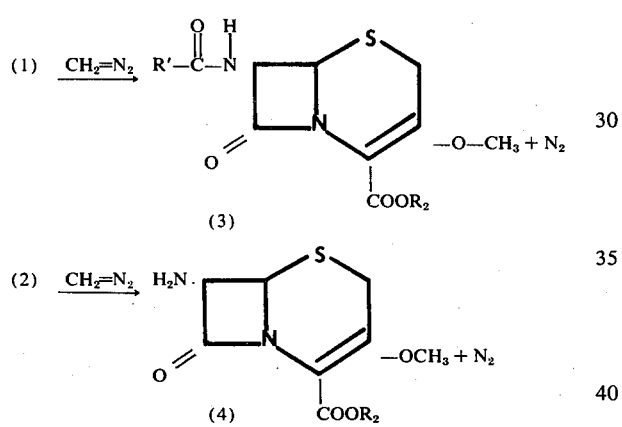

Alternatively, the 3-hydroxy nucleus ester (2) can be acylated to provide the 7-acylamido-3-hydroxy-3-cephem-4-carboxylic acid ester (1) which on reaction with the desired diazo compound yields the compound (3) of the invention.

According to still another synthetic pathway for preparing compounds of the invention, the 3-alkoxy nucleus ester (4) can be acylated to provide a cephalosporin ether (3). Removal of the ester group $R_2$ in (3) provides an antibiotic compound of the invention.

The compounds of the Formula I wherein

represents an acyl group which is capable of reacting with ozone are prepared by the acylation of a 7-amino-3-alkoxy-3-cephem-4-carboxylic acid ester or by the acylation of a 7-amino-3-hydroxy-3-cephem-4-carboxylic acid ester followed by the reaction of the acylated ester with one of the described diazo compounds. For example, when in the Formula I, R' contains a carbon to carbon double bond such as in an alkenyl group or an oxidizable sulfur atom such as that of the thiophene ring, the compounds having such oxidizable acyl groups are best prepared by the acylation of the hydroxy or alkoxy nucleus ester.

In one of its aspects this invention provides a method for the preparation of 3-hydroxy-3-cephem esters. According to this method a 3-exomethylenecepham ester represented by the Formula II

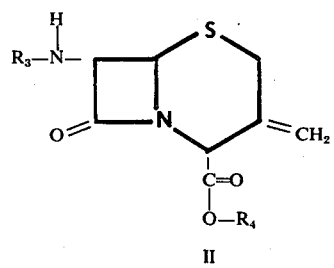

II is reacted with ozone to form an intermediate ozonide which on decomposition affords a 3-hydroxy-3-cephem ester of the Formula III

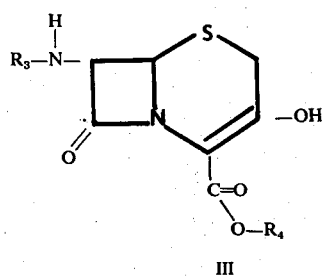

III wherein
$R_4$ is a carboxylic acid protecting ester forming group, and
$R_3$ is hydrogen, $C_2$-$C_7$ alkanoyl, cyanoacetyl, haloacetyl, 5'-protected-amino-5'-carboxyvaleryl, or an acyl group of the formula

wherein R'' is phenyl, or phenyl substituted by halogen, hydroxy, nitro, amino, cyano, $C_1$-$C_4$ lower alkyl, $C_1$-$C_4$ lower alkoxy, hydroxymethyl, aminomethyl, carboxy or carboxymethyl; or an arylalkanoyl group of the formula

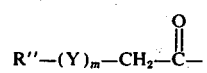

wherein
R" is as defined above,
Y is O or S, and
m is 0 or 1;
or a substituted arylalkanoyl group of the formula

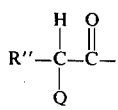

wherein R" is as defined above and
Q is hydroxy or protected hydroxy.

The ozonolysis of a 7-amino-3-exomethylenecepham-4-carboxylic acid ester or a 7-acylamido-3-exomethylenecepham-4-carboxylic acid ester of the Formula II is carried out by passing ozone through a solution of the 3-exomethylenecepham ester in an inert solvent at a temperature between about $-80°$ and $0°C$. The exomethylene double bond reacts with ozone to form in situ an intermediate ozonide which is decomposed, as hereinafter described, to form the 3-hydroxy-3-cephem ester of the Formula III. Although the 3-exomethylene cephalosporins can also undergo oxidation with ozone to form the sulfoxide, under the ozonization condition of the present method the exo double bond reacts preferentially with ozone to form the ozonide. The formation of the sulfoxide occurs as a result of over oxidation. Whereas the exo double bond reacts rapidly with ozone, the reaction at the sulfur atom of the dihydrothiazine ring to form the sulfoxide occurs at a much slower rate. However, the following over oxidation products can be formed in the ozonolysis reaction.

Alternatively, the ozonolysis reaction can be followed chromatographically. For instance, a small aliquot of the reaction mixture is withdrawn, the ozonide decomposed, and the amount of unreacted starting material and 3-hydroxy-3-cephem product present in the sample is assessed by a comparison of the thin layer chromatogram with that of a known amount of starting material and 3-hydroxy-3-cephem compound.

Inert solvents which can be used in the ozonolysis method of this invention are those solvents in which the 3-exomethylene cepham esters are at least partially soluble and which are unreactive with ozone under the described conditions. Commonly used organic solvents such as methanol, ethanol, ethyl acetate, methyl acetate, and methylene chloride are satisfactory.

The concentration of the starting material in the inert solvent is not critical and it is preferred to use a solvent volume sufficient to form a complete solution.

The preferred temperature in the ozonolysis reaction is between about $-80°$ and $-50°C$.

When ozonide formation is complete as determined by either method described above, any excess ozone present in the reaction mixture is purged from the mixture by bubbling nitrogen or oxygen through the mixture.

Following the removal of any excess ozone, the ozonide is decomposed by adding to the reaction mixture a mild reducing reagent selected from the group consisting of sodium bisulfite, sulfur dioxide, and trimethyl phosphite to provide the 3-hydroxy-3-cephem-4-carboxylic acid ester. The decomposition is carried out by adding an excess of the reducing reagent and then stirring the reaction mixture at a temperature of about

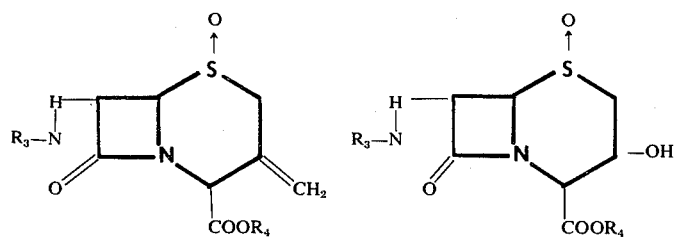

Ozone gas is prepared by means of an ozone generator of the type commonly used in synthetic and analytical chemical work to produce ozone by the action of an electric discharge on oxygen. One such ozone generator is that manufactured by the Welsbach Corporation. The ozone is generated in a stream of oxygen which is then passed directly into the reaction vessel. The percentage of ozone contained in the oxygen stream can be varied as desired, for example, by varying the rate of flow of oxygen through the ozonizer as well as by varying the intensity of the electric discharge. The percentage of ozone in the oxygen stream can be determined iodometrically by titrating with sodium thiosulfate the amount of iodine liberated from a standard solution of potassium iodide by ozone from the generator. The percentage of ozone in the oxygen stream is not critical, however for convenience in carrying out the ozonolysis method of this invention an estimate of the amount of ozone flowing into the reaction mixture enables one to determine the time at which the desired reaction should be complete and thus minimizes the formation of over oxidation products.

$-80°$ to $0°C$. until the reaction mixture is negative in the potassium iodide-starch test.

A preferred reagent for decomposing the intermediate ozonide is gaseous sulfur dioxide. This reagent is preferred since it is completely volatilized from the reaction mixture during the subsequent work-up and thus does not complicate the recovery of the reaction product.

Although ozone is the preferred oxidizing reagent in the present method it will be recognized by those skilled in the art that other oxidizing reagents such as permanganates, periodates and peroxides which are known oxidants of carbon to carbon double bonds can be used in the preparation of 3-hydroxy-3-cephem esters.

The 7-acylamido-3-hydroxy-3-cephem-4-carboxylic acid esters are recovered from the reaction mixture by first evaporating the mixture to dryness and thereafter extracting the product from the residue. Alternatively, acylated 3-hydroxy-3-cephem esters can be recovered from the organic liquid phase of the decomposition mixture by separating the liquid phase from insolubles, and after washing and drying, the organic layer is evaporated to yield the 3-hydroxy ester.

The 3-hydroxy nucleus ester, a 7-amino-3-hydroxy-3-cephem-4-carboxylic acid ester, is best isolated in the form of a salt as for example, the hydrochloride or hydrobromide salt.

When an ester of 7-amino-3-exomethylenecepham-4-carboxylic acid (Formula II, $R_3$=H) is ozonized it is preferable to use a salt of this nucleus, for example, the hydrochloride or p-toluenesulfonate salt.

In a preferred embodiment of the ozonolysis process of this invention, p-methoxybenzyl 7-phenoxyacetamido-3-methylenecepham-4-carboxylate is dissolved in ethyl acetate and reacted with ozone at a temperature of about −78°C. The excess ozone is expelled by bubbling oxygen through the cold solution. The ozonide is decomposed by adding excess sodium bisulfite to the reaction mixture and stirring the mixture at 0°C. The organic layer is decanted from the insolubles and is washed, dried and evaporated to yield p-methoxybenzyl 7-phenoxyacetamido-3-hydroxy-3-cephem-4-carboxylate.

In a further preferred embodiment p-nitrobenzyl 7-amino-3-methylenecepham-4-carboxylate hydrochloride is dissolved in methanol and ozone is bubbled through the solution at a temperature of about −78°C. Excess ozone is purged from the mixture with nitrogen and the ozonide is decomposed by bubbling sulfur dioxide through the mixture. The reaction mixture is evaporated to dryness and the residue, p-nitrobenzyl 7-amino-3-hydroxy-3-cephem-4-carboxylate is obtained as the hydrochloride salt.

Preferred starting materials in the ozonolysis process are the hydrochloride salts of 7-amino-3-exomethylenecepham esters (Formula II, $R_3$=H). Illustrative of these 3-exomethylenecepham nucleus esters are p-nitrobenzyl 7-amino-3-exomethylenecepham-4-carboxylate, p-methoxybenzyl 7-amino-3-exomethylenecepham-4-carboxylate, 2,2,2-trichloroethyl 7-amino-3-exomethylenecepham-4-carboxylate, benzhydryl 7-amino-3-exomethylenecepham-4-carboxylate, and the acid addition salts thereof formed with hydrochloric acid, hydrobromic acid and p-toluenesulfonic acid.

Illustrative of the 7-acylamido-3-exomethylenecepham-4-carboxylic acid esters which can be employed as starting materials (Formula II) are p-nitrobenzyl 7-acetamido-3-exomethylenecepham-4-carboxylate, p-nitrobenzyl 7-phenoxyacetamido-3-exomethylenecepham-4-carboxylate, p-methoxybenzyl 7-phenylacetamido-3-exomethylenecepham-4-carboxylate, p-nitrobenzyl 7-(D-α-phenyl-α-formyloxyacetamido)-3-exomethylenecepham-4-carboxylate, benzhydryl 7-benzamido-3-exomethylenecepham-4-carboxylate, p-methoxybenzyl 7-propionamido-3-exomethylenecepham-4-carboxylate, di-p-nitrobenzyl 7-(5-carboxy-5-propionamidovaleramido)-3-exomethylenecepham-4-carboxylate, and di-p-nitrobenzyl 7-(5-carboxy-5-chloroacetamidovaleramido)-3-cephem-4-carboxylate.

The 3-hydroxy-3-cephem compounds (Formula I, $R_1$=H) can be characterized as enols which can exist in equilibrium with the keto form as illustrated by the following generalized scheme.

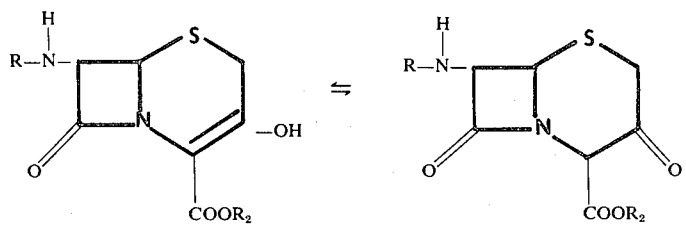

Based on observations of the ultraviolet absorption spectra of these compounds at varying pH, the enol form predominates at neutral or basic pH while at acid pH the keto form predominates. For example, methyl 7-phenoxyacetamido-3-hydroxy-3-cephem-4-carboxylate showed at the indicated pH the following absorption pattern in the 260 mµ region of the ultraviolet spectrum, the characteristic absorption of the Δ-3 unsaturation in the cephalosporins.

Ethanol, neutral: λ max 268 mµ ($\epsilon$ = 4,100)
Ethanol, acidic: λ max 268 mµ ($\epsilon$ = 2,600)
Ethanol, basic: λ max 275 mµ ($\epsilon$ = 7,200)
pH 7 buffer: λ max 273 mµ ($\epsilon$ = 7,800).

As indicated by their absorption in the 260 mµ region of the ultraviolet spectrum the compounds characterized herein as 3-hydroxy-3-cephem compounds exist partially in the keto form and can react as such when the reaction conditions favor the keto form.

A preferred class of 3-hydroxy-3-cephem compounds (Formula I, $R_1$=H) are the 7-amino-3-hydroxy-3-cephem-4-carboxylic acid esters, for example, p-nitrobenzyl 7-amino-3-hydroxy-3-cephem-4-carboxylate, p-methoxybenzyl 7-amino-3-hydroxy-3-cephem-4-carboxylate, 2,2,2-trichloroethyl 7-amino-3-hydroxy-3-cephem-4-carboxylate, benzhydryl 7-amino-3-hydroxy-3-cephem-4-carboxylate, benzyl 7-amino-3-hydroxy-3-cephem-4-carboxylate and the acid addition salts thereof for example the hydrochlorides.

The 3-hydroxy-3-cephem nucleus esters are key intermediates in the synthesis of the cephalosporin ethers (Formula I, R =

and $R_1$ = H). As previously mentioned they can be acylated with a derivative of a carboxylic acid to provide the 7-acylamido-3-hydroxy-3-cephem-4-carboxylic acid esters which in turn can be reacted with diazomethane, diazoethane, diphenyldiazomethane or 1-diazo-3-methyl-2-butene to provide the cephalosporin ether. Also, these nucleus esters can be reacted with the diazo compound to provide the respective ether derivative of the nucleus ester for subsequent acylation.

The acylation of a 7-amino-3-hydroxy-3-cephem-4-carboxylic acid ester can be carried out by following the known procedures used for the acylation of other cephalosporin nuclei such as 7-ACA or 7-ADCA. For example, the hydroxy nucleus ester can be reacted with active carboxylic acid derivatives such as an activated ester, for example, the pentachlorophenyl ester, a mixed anhydride or an azide derivative. Also the 3-hydroxy nucleus ester can be acylated with the desired carboxylic acid in the presence of a condensing agent, for example, a carbodiimide such as dicyclohexylcarbodiimide, or N-ethoxycarbonyl-2-ethoxy-1,2-dihydroquinoline (EEDQ). Acylation can also be carried out by reacting a carboxylic acid halide with the 3-hydroxy nucleus ester in the presence of a hydrogen halide acceptor. Hydrogen halide acceptors which can be used are tertiary amines such as triethylamine and pyridine, alkylene oxides such as propylene oxide, the ureas for example urea and methyl urea; and inorganic bases such as sodium bicarbonate, potassium bicarbonate, sodium carbonate, sodium bisulfite and like hydrogen halide acceptors. When the acylation is carried out under anhydrous conditions the 3-hydroxy group undergoes O-acylation or esterification in a competing reaction to provide a reaction product mixture containing the desired 7-acylamido-3-hydroxy-3-cephem-4-carboxylic acid ester and the N,O-diacylated product. For example, when p-nitrobenzyl 3-hydroxy-3-cephem-4-carboxylate is reacted under anhydrous conditions with thiophene-2-acetyl chloride in the presence of urea the N,O-diacylated product percent by volume of the organic solvent is suitable. Larger amounts of water can be used however.

The non-anhydrous acylation is carried out as illustrated by the following preparation of p-nitrobenzyl 7-[2-(2'-thienyl)acetamido]-3-hydroxy-3-cephem-4-carboxylate. p-Nitrobenzyl 7-amino-3-hydroxy-3-cephem-4-carboxylate is dissolved in tetrahydrofuran-water (3 to 1 by volume) and an excess of sodium bisulfite is suspended in the solution. A solution of excess thiophene-2-acetyl chloride in tetrahydrofuran is added to the suspension with stirring. The mixture is stirred for about 2 hours at about 20°–25°C. The water miscible solvent is evaporated in vacuo and the reaction product is recovered from the aqueous residue by extraction with a water immiscible organic solvent, for example, ethyl acetate.

Following the same procedures p-nitrobenzyl 7-amino-3-hydroxy-3-cephem-4-carboxylate hydrochloride is reacted in aqueous acetone with O-formyl mandeloyl chloride in the presence of sodium bisulfite to yield p-nitrobenzyl 7-(α-formyloxy-α-phenylacetylamino-3-hydroxy-3-cephem-4-carboxylate. Similarly, p-nitrobenzyl 7-amino-3-hydroxy-3-cephem-4-carboxylate hydrochloride is reacted in aqueous acetonitrile with phenoxyacetyl chloride in the presence of propylene oxide to yield, p-nitrobenzyl 7-phenoxyacetamido-3-hydroxy-3-cephem-4-carboxy-

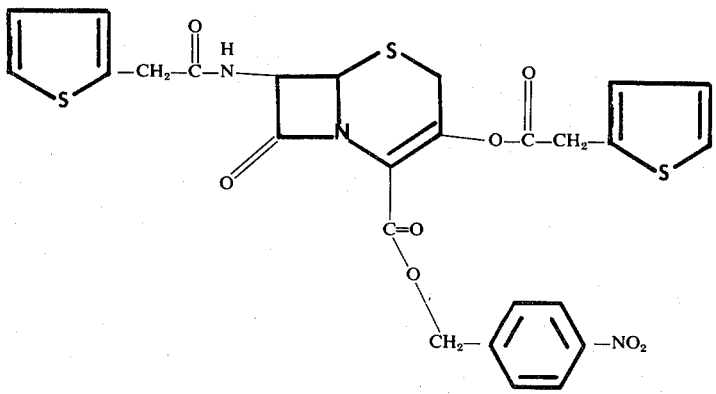

is formed along with the desired p-nitrobenzyl 7-[2-(2-thienyl) acetamido]-3-hydroxy-3-cephem-4-carboxylate. The acylation products can be separated from each other by chromatography.

The preferred method of acylating a 3-hydroxy cephalosporin nucleus ester is by carrying out the acylation reaction in the presence of water for example in a wet solvent or in a mixture of an organic solvent and water. When water is present in the acylation reaction mixture acylation occurs exclusively at the amino group to provide the desired 7-acylamido-3-hydroxy ester even if an excess of the acylating reagent is used.

In carrying out the non-anhydrous acylation of a 3-hydroxy cephalosporin nucleus ester, the carboxylic acid chlorides or bromides or activated esters, azides or mixed anhydrides can be used. Solvents which can be used are the ethers such as tetrahydrofuran or dioxane, the ketones such as acetone, methyl ethyl ketone or the like, alkyl nitriles such as acetonitrile, or any suitable organic solvent which itself is unreactive toward the acylating reagent.

The acylation reaction is carried out conveniently at a temperature between about 5° and 25°C.

The amount of water present in the reaction mixture does not appear to be critical and in general about 5 late.

The 3-hydroxy cephalosporin nucleus esters can be acylated in a wide variety of amide coupling reactions and with a wide variety of acyl groups to provide the compounds of the Formula I wherein $R_1$ is hydrogen.

Compounds represented by the Formula I which bear an ozone reactive acyl moiety, and which consequently are not desirably prepared by the ozonolysis of the corresponding 7-acylamido-3-exomethylenecepham ester, can be prepared by the acylation of the 3-hydroxy cephalosporin nucleus ester as described above. For example, the compounds of the Formula I wherein $R_1$ is hydrogen and the acyl group

represents 2-thienylacetyl, 3-thienylacetyl, 1-tetrazylacetyl, 2-oxazylacetyl, 2-thiazylacetyl or an unsaturated group such as crotonyl, or cyclohexadienyl can be prepared by the nonanhydrous acylation of a 3-hydroxy cephalosporin nucleus ester as described above.

The 7-acetamido-3-hydroxy-3-cephem-4-carboxylic acid esters are conveniently prepared by reacting the 3-hydroxy nucleus ester with ketene in aqueous acetone.

The antibiotic compounds of this invention, the 3-methoxy, ethoxy, diphenylmethyloxy and 3-methyl-2-butenyl-1-oxy-3-cephem-4-carboxylic acids (Formula I, R =

$R_2 = H$ and $R_1$ is other than hydrogen) are prepared by reacting a 3-hydroxy-3-cephem ester intermediate (Formula I, $R_2$ is other than hydrogen and $R_1$ is hydrogen) with the respective diazo compound. The ester forming group, $R_2$, is then removed to provide the antibiotic compound represented by the Formula I wherein R is an acyl group

$R_1$ is other than hydrogen and $R_2$ is hydrogen.

The diazo compounds employed in the present reaction are diazomethane, diazoethane, diphenyldiazomethane and 1-diazo-3-methyl-2-butene. The diazo compounds are prepared by known procedures and are readily available.

The etherification reaction is carried out by adding an ethereal solution of the diazo compound to a solution of the 3-hydroxy cephalosporin ester in an inert solvent. An excess of the diazo compound is desirable. The etherification proceeds at a satisfactory rate at a temperature between about 20° and 25°C. Inert solvents which can be employed are those which are unreactive toward the diazo compound and preferably the chlorinated hydrocarbon solvents, for example methylene chloride and chloroform.

The rate of the etherification reaction can be enhanced by the addition of a catalytic amount of boron trifluoride etherate to the reaction mixture. Ordinarily the etherification reaction with diazomethane proceeds to completion in about 2 hours.

The cephalosporin ethers are readily recovered from the etherification reaction mixture and purified by evaporation of the mixture to dryness and crystallizataon of the residue.

The 3-hydroxy-3-cephem esters can also be reacted with etherifying reagents other than diazo compounds, to provide varying ether substituents. For example, the 3-hydroxy-3-cephem esters can be reacted in the presence of a base with methyl iodide, a lower alkyl ester of sulfuric acid such as dimethyl sulfate or with trimethyl oxonium fluoroborate to provide the methyl ether or a higher homolog thereof. Activated halo compounds can also react in the presence of a base with the 3-hydroxy-3-cephem esters to provide other ether derivatives. For example, activated halo compounds such as the α-haloethers, chloromethyl methyl ether and bromomethyl ethyl ether; α-haloacid esters such as ethyl bromoacetate, methyl chloroacetate, ethyl α-bromopropionate; and allylic halides such as allyl bromide and allyl chloride can react to provide 3-cephem-3-ethers. The preparation of 3-cephem-3-ethers with the above mentioned reagents is accompanied by alkylation in the 4-position of the dihydrothiazine ring. For example, methyl iodide reacts with p-nitrobenzyl 7-phenylacetamido-3-hydroxy-3-cephem-4-carboxylate in the presence of a base to yield a reaction product mixture comprising the desired 3-methoxy ether, the 4-methyl-3-hydroxy-2-cephem-4-carboxylate and the 4-methyl-3-methoxy-2-cephem-4-carboxylate. Such mixtures can be separated by chromatography to provide the desired 3-ether.

The preferred etherifying reagents, the above named diazo compounds such as diazomethane, react with the 3-hydroxy-3-cephem esters to provide the 3-cephem ethers without concurrent alkylation in the 4-position.

In a specific embodiment of this invention p-nitrobenzyl 7-[2-(2-thienyl)acetamido]-3-hydroxy-3-cephem-4-carboxylate is dissolved in methylene chloride and a solution of excess diazomethane in methylene chloride is added. The reaction mixture is stored at room temperature for 2 hours, the solvent evaporated, and the residue dissolved in ethyl acetate. The ethyl acetate solution is chilled to precipitate p-nitrobenzyl 7-[2-(2-thienyl)acetamido]-3-methoxy-3-cephem-4-carboxylate as a crystalline solid.

In a similar manner the 3-ethoxy compound is prepared with diazoethane.

As described in the methods and procedures of this invention the carboxylic acid group of the cephalosporin compound is protected with a cleavable ester forming group such as one of those previously listed. Likewise, the compounds of the Formula I wherein the acylamido group bears an hydroxyl group or an amino group substituent, as for example the mandeloyl and aminoadipoyl groups, such reactive functions are protected with a cleavable blocking group. The carboxylic acid, amino and hydroxyl group protecting groups which are described herein are only illustrative of the many known protecting groups which will be recognized as applicable in this invention. The only requirement being that such groups be stable blocking groups under the described conditions of ozonolysis, acylation and etherification and that they be readily removed by acid or base hydrolysis or catalytic hydrogenolysis under conditions which are not destructive of the cephalosporin molecule.

Preferred carboxylic acid protecting groups of the present invention are the p-nitrobenzyl, p-methoxybenzyl and benzhydryl groups. The p-nitrobenzyl ester group is removed by catalytic hydrogenolysis under acidic conditions as described by U.S. Pat. No. 3,632,850. The p-methoxybenzyl and benzhydryl groups are cleaved with trifluoroacetic acid at 0°–10°C. in anisole, as described by J. Org. Chem., 36, 1259 (1971). However other carboxylic acid protecting ester forming groups such as the benzyl, 2,2,2-trichloroethyl and t-butyl groups can be employed.

Preferred hydroxyl group protecting groups are the formyl group and the methoxy ethyl group,

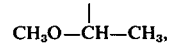

formed by the reaction of the hydroxyl group with methyl vinyl ether.

Preferred amino protecting groups are the t-butyloxycarbamido group, and the 1-carbomethoxy-2-propenyl group prepared by the condensation of the amino group with acetoacetic ester.

Following the preparation of a cephalosporin ether (Formula I, $R_1$ = other than H) the carboxylic acid protecting ester group and, if such are present in the side chain, the hydroxyl and amino protecting groups are removed to provide an antibiotic compound of the invention. Accordingly the cephalosporin esters, protected amino compounds and protected hydroxyl group compounds are useful as intermediates in the preparation of the cephalosporin ether antibiotics.

Illustrative of the cephalosporin antibiotics provided by this invention are the following:

7-acetamido-3-methoxy-3-cephem-4-carboxylic acid,
7-propionamido-3-methoxy-3-cephem-4-carboxylic acid,
7-cyanoacetamido-3-methoxy-3-cephem-4-carboxylic acid,
7-chloroacetamido-3-methoxy-3-cephem-4-carboxylic acid,
7-phenylacetamido-3-methoxy-3-cephem-4-carboxylic acid,
7-(4-chlorophenylacetamido)-3-methoxy-3-cephem-4-carboxylic acid,
7-(4-methoxyphenylacetamido)-3-methoxy-3-cephem-4-carboxylic acid,
7-(3,4-dichlorophenoxyacetamido)-3-methoxy-3-cephem-4-carboxylic acid,
7-phenoxyacetamido-3-ethoxy-3-cephem-4-carboxylic acid,
7-thiophenoxyacetamido-3-methoxy-3-cephem-4-carboxylic acid,
7-(4-chlorothiophenoxyacetamido)-3-methoxy-3-cephem-4-carboxylic acid,
7-phenoxyacetamido-3-methoxy-3-cephem-4-carboxylic acid,
7-acetamido-3-ethoxy-3-cephem-4-carboxylic acid,
7-(4-hydroxyphenoxyacetamido)-3-methoxy-3-cephem-4-carboxylic acid,
7-benzamido-3-methoxy-3-cephem-4-carboxylic acid,
7-(2,6-dimethoxybenzamido)-3-methoxy-3-cephem-4-carboxylic acid,
7-(3,4-dichlorobenzamido)-3-methoxy-3-cephem-4-carboxylic acid,
7-(3-bromobenzamido)-3-methoxy-3-cephem-4-carboxylic acid,
7-(2-chlorophenoxyacetamido)-3-methoxy-3-cephem-4-carboxylic acid,
7-(4-cyanophenylacetamido)-3-methoxy-3-cephem-4-carboxylic acid,
7-(4-nitrophenylacetamido)-3-methoxy-3-cephem-4-carboxylic acid,
7-[2-(2-thienyl)acetamido]-3-methoxy-3-cephem-4-carboxylic acid,
7-[2-(2thienyl)acetamido]-3-ethoxy-3-cephem-4-carboxylic acid,
7-[2-(3-thienyl)acetamido]-3-methoxy-3-cephem-4-carboxylic acid,
7-[2-(2-furyl)acetamido]-3-methoxy-3-cephem-4-carboxylic acid,
7-[2-(1-tetrazyl)acetamido]-3-methoxy-3-cephem-4-carboxylic acid,
7-[2-(2-oxazyl)acetamido]-3-methoxy-3-cephem-4-carboxylic acid,
7-[2-(2-thiazyl)acetamido]-3-methoxy-3-cephem-4-carboxylic acid,
7-[2-(5-tetrazyl)acetamido]-3-methoxy-3-cephem-4-carboxylic acid,
7-(D-mandelamido)-3-methoxy-3-cephem-4-carboxylic acid,
7-(2-chlorothiophenoxyacetamido)-3-methoxy-3-cephem-4-carboxylic acid,
7-(D-4-hydroxymandelamido)-3-methoxy-3-cephem-4-carboxylic acid,
7-(D-3-hydroxymandelamido)-3-methoxy-3-cephem-4-carboxylic acid,
7-(D-3-methoxymandelamido)-3-methoxy-3-cephem-4-carboxylic acid,
7-(D-mandelamido)-3-ethoxy-3-cephem-4-carboxylic acid,
7-phenylacetamido-3-benzhydryloxy-3-cephem-4-carboxylic acid,
7-[2-(2-thienyl)acetamido]-3-(3-methyl-2-butenyl-1-oxy)-3-cephem-4-carboxylic acid,
7-phenoxyacetamido-3-benzhydryloxy-3-cephem-4-carboxylic acid,
7-acetamido-3-(3-methyl-2-butenyl-1-oxy)-3-cephem-4-carboxylic acid,
7-[2-(2-oxazyl)acetamido]-3-ethoxy-3-cephem-4-carboxylic acid,
7-(5-amino-5-carboxyvaleramido)-3-methoxy-3-cephem-4-carboxylic acid,
7-(4-aminomethylphenylacetamido)-3-methoxy-3-cephem-4-carboxylic acid,
7-(4-carboxymethylphenylacetamido)-3-methoxy-3-cephem-4-carboxylic acid, and
7-(3-chloro-4-hydroxyphenoxyacetamido)-3-methoxy-3-cephem-4-carboxylate.

The cephalosporin ether nuclei (Formula I, R = H, and $R_1$ is other than H) are especially valuable compounds since they can be acylated with the desired acyl group to provide an antibiotic compound of the invention (Formula I, R = acyl, and $R_1$ is other than H).

The acylation of these nuclei can be carried out by the known methods used for the acylation of 7-aminocephalosporanic acid or 7-aminodeacetoxycephalosporanic acid. The cephalosporin ether nucleus acids or esters can be acylated under anhydrous acylation methods as well as in the presence of water. Accordingly, the cephalosporin ether nucleus free acid or an ester thereof can be acylated with a carboxylic acid halide in an aqueous solvent system, for example aqueous acetone, in the presence of a hydrogen halide acceptor such as triethyl amine, pyridine or sodium bicarbonate. The acylation can also be effected by reacting an ester of the ether nucleus with a carboxylic acid in the presence of a condensing agent such as N-ethoxycarbonyl-2-ethoxy-1,2-dihydroquinoline (EEDQ) or dicyclohexylcarbodiimide. Also the ether nucleus ester can be acylated with the anhydride of a carboxylic acid or with a mixed anhydride. By yet another known acylation method, the ether nucleus can be acylated with an active ester of a carboxylic acid, for example the pentachlorophenyl ester of a carboxylic acid.

For example, p-nitrobenzyl 7-amino-3-methoxy-3-cephem-4-carboxylate is reacted with thiophene-2-acetyl chloride in aqueous acetone containing sodium bicarbonate to provide p-nitrobenzyl 7-[2-(2-thienyl)acetamido]-3-methoxy-3-cephem-4-carboxylate.

p-Nitrobenzyl 7-amino-3-methoxy-3-cephem-4-carboxylate is reacted with phenoxyacetic acid in a tetrahydrofuranacetone solvent mixture in the presence of EEDQ to provide p-nitrobenzyl 7-phenoxyacetamido-3-methoxy-3-cephem-4-carboxylate.

p-Nitrobenzyl 7-amino-3-methoxy-3-cephem-4-carboxylate is reacted with mandelic O-carboxy-anhydride in ethyl acetate to provide p-nitrobenzyl 7-(D-α-mandelamido)-3-methoxy-3-cephem-4-carboxylate.

Illustrative of the acylating groups which can be employed in the above methods are thiophene-2-acetyl chloride, phenoxyacetyl chloride, phenylacetyl chloride, pentachlorophenyl thiophene-3-carboxylate, oxazole-2-acetyl bromide, thiazole-2-acetyl chloride, tetrazole-1-acetic acid, mandelic acid O-carboxy anhydride, 4-hydroxymandelic acid O-carboxy anhydride, 4-chlorophenoxyacetyl bromide, benzoyl chloride, 4-cyanobenzoyl chloride, 4-cyanophenylacetyl chloride, 3,4-dichlorothiophenoxyacetyl chloride, and the like.

Illustrative of the cephalosporin ether nucleus acids and esters thereof which are provided by this invention are 7-amino-3-methoxy-3-cephem-4-carboxylic acid, 7-amino-3-ethoxy-3-cephem-4-carboxylic acid, p-nitrobenzyl 7-amino-3-methoxy-3-cephem-4-carboxylate, p-methoxybenzyl 7-amino-3-methoxy-3-cephem-4-carboxylate, 2,2,2-trichloroethyl 7-amino-3-methoxy-3-cephem-4-carboxylate, 2,2,2-trichloroethyl 7-amino-3-ethoxy-3-cephem-4-carboxylate, diphenylmethyl 7-amino-3-methoxy-3-cephem-4-carboxylate, p-nitrobenzyl 7-amino-3-benzhydryloxy-3-cephem-4-carboxylate, 7-amino-3-benzhydryloxy-3-cephem-4-carboxylic acid, and p-nitrobenzyl 7-amino-3-(3-methyl-2-butenyl-1-oxy)-3-cephem-4-carboxylate.

The cephalosporin ether nucleus esters can also be prepared by the cleavage of the protected-aminoadipoyl side chain from a 3-ether derivative of cephalosporin C. For example, 7-(5-propionamido-5-carboxyvaleramido)-3-methoxy-3-cephem-4-carboxylic acid dibenzhydryl ester is reacted with phosphorus pentachloride in the presence of pyridine to provide the imino halide which on reaction with added methanol affords the methyl enol ether. The enol ether is readily hydrolyzed to yield benzhydryl 7-amino-3-methoxy-3-cephem-4-carboxylate. The side chain cleavage reaction is carried out by following the known $PCl_5$ cleavage conditions and procedures which are used in the cleavage of the aminodipoyl side chain of cephalosporin C to provide a 7-aminocephalosporanic acid ester.

Accordingly, the 7-(5-protected amino-5-carboxyvaleramido)-3-exomethylenecepham-4-carboxylic acid diesters wherein the protected amino group is the chloroacetamido, propionamido or 2,4-dichlorobenzamido group (Formula II, $R_3$ = 5-protected amino-5-carboxyvaleryl), are converted to the 3-ether derivative (Formula III, $R_3$ = 5-protected amino-5-carboxyvaleryl, and $R_1$ is other than hydrogen) by the ozonolysis and etherification methods of this invention as described previously. Accordingly 7-(5-propionamido-5-carboxyvaleramido)-3-methoxy-3-cephem-4-carboxylic acid, 7-(5-chloroacetamido-5-carboxyvaleramido)-3-methoxy-3-cephem-4-carboxylic acid and, 7-[5-(2,4-dichlorobenzamido)-5-carboxyvaleramido]-3-methoxy-3-cephem-4-carboxylic acid and the readily removable diesters thereof and notably the benzhydryl esters are a particularly useful group of compounds. Likewise, the correspondingly substituted exomethylenecepham esters are useful starting materials for the preparation of these compounds.

Following the procedures described above the 7-methoxy derivative of cephalosporin C, which is obtained as a fermentation product of a Streptomycete as described in J. Am. Chem. Soc. 93, 2308 (1971), can be converted to the 7-methoxy-3-exomethylenecepham ester. Following the ozonolysis and etherification reactions disclosed herein the 3,7-dimethoxy-3-cephem ester can be prepared and on cleavage of the protected aminoadipoyl side chain with $PCl_5$ in the presence of pyridine, an ester of 7-amino-3,7-dimethoxy-3-cephem-4-carboxylic acid, for example the benzhydryl or p-nitrobenzyl ester, is obtained. The 7-amino-3,7-dimethoxy nucleus ester can be acylated by known procedures to provide 7-acylamido-3,7-dimethoxy-3-cephem-4-carboxylates. Removal of the ester group provides an antibiotic 7-acylamido-3,7-dimethoxy-3-cephem-4-carboxylic acid. For example, 7-mandelamido-3,7-dimethoxy-3-cephem-4-carboxylic acid, 7-[2-(2-thienyl)acetamido]-3,7-dimethoxy-3-cephem-4-carboxylic acid and the 7-(3- or 4-hydroxymandelamido)-3,7-dimethoxy-3-cephem-4-carboxylic acid can be prepared.

The 3-etherified 7-acylamido-3-cephem-4-carboxylic acids (Formula I, R =

$R_1$ = methyl, ethyl, benzhydryl or 3-methyl-2-butenyl, $R_2$ = hydrogen) are useful antibiotic compounds which inhibit the growth of gram-positive and gram-negative microorganisms.

In Table I which follows, the minimum inhibitory concentration (MIC) of the compounds of the invention is illustrated by the data presented for the listed compounds. The data were obtained by the standard agar disc method.

TABLE I

ANTIBIOTIC SPECTRUM OF CEPHALOSPORIN ETHERS
Disc-Plate Method

| Microorganism | Antibiotic[1] Concentration mg/ml Zone of Inhibition (diameter in mm)[2] | | | | | |
|---|---|---|---|---|---|---|
| | A | | | B | | |
| | 1.0 | 0.1 | 0.01 | 1.0 | 0.1 | 0.01 |
| Staphylococcus aureus | 31 | 24 | 10 | 34 | 25 | 16 |
| Bacillus subtilis | 44 | 32 | 16 | 42 | 27 | 15 |
| Sarcina lutea | 33 | 23 | T | 29 | 23 | 13 |
| Mycobacterium avium | T | 0 | — | — | — | — |
| Saccharomyces pastorianus | — | — | — | — | — | — |
| Neurospora crassa | — | — | — | — | — | — |
| Candida tropicalis | — | — | — | — | — | — |
| Fusarium moniliforme | — | — | — | — | — | — |
| Trichophyton mentagrophytes | — | — | — | — | — | — |
| Proteus vulgaris | 20 | 15 | — | 24 | — | — |
| Salmonella gallinarum | 23 | T | — | 24 | 14 | — |
| Escherichia coli | 21 | 13 | — | 28 | 16 | — |
| Pseudomonas aeruginosa | — | — | — | — | — | — |
| Klebsiella pneumoniae | 23 | 13 | — | 23 | 15 | — |
| Serratia marcescens | — | — | — | — | — | — |
| Pseudomonas solanacearum | 31 | 22 | — | 34 | 26 | T |

[1]Compound A = 7-[2-(2-thienyl)acetamido]-3-methoxy-3-cephem-4-carboxylic acid.
Compound B = 7-(D-mandelamido)-3-methoxy-3-cephem-4-carboxylic acid.
[2]A "T" indicates a trace zone of inhibition.
A dash indicates no observed zone of inhibition at the test concentration.

The following Table II lists the minimum inhibitory concentrations (MIC) for compounds of the invention against clinical isolates of penicillin resistant Staphylococcus both in the presence and absence of serum. The MIC values were determined by the Gradient Plate technique performed essentially as described by Byrson and Szybalski, Science, 116, 45 (1952).

TABLE II

| Compound[1] | Antibiotic Activity vs. Penicillin Resistant *Staphylococcus* *Staphylococcus* Clinical Isolates MIC (mcg/ml) | | | | | | | | | |
|---|---|---|---|---|---|---|---|---|---|---|
| | V-41 | | V-32 | | X-400 | | V-84 | | X1.1 | |
| | NS[3] | S | NS | S | NS | S | NS | S | NS | S |
| A | >20 | >20 | >20 | >20 | >20 | >20 | 4.8 | >20 | 0.8 | 3.0 |
| B | 18.4 | >20 | >20 | >20 | >20 | >20 | 9.4 | 11.1 | 0.6 | 0.5 |

[1] Compounds A and B are the compounds of footnote 1 of Table I
[2] Methicillin resistant *Staphylococcus*
[3] NS - no serum
S - serum In Table III below, the MIC values for the test compounds against representative gram-negative organisms is presented. The data were obtained by the Gradient Plate technique.

TABLE III

Antibiotic Activity vs. Gram-negative Organisms

| Organism | MIC of Test Compound[1] (mcg/ml) | |
|---|---|---|
| | A | B |
| *Shigella sp.* | 48.8 | 8.0 |
| *Escherichia coli* | 57.5 | 8.6 |
| *Klebsiella pneumoniae* | 11.2 | 4.5 |
| *Aerobacter aerogenes* | 9.9 | 4.3 |
| *Salmonella heidelberg* | 9.8 | 4.8 |
| *Pseudomonas aeruginosa* | >200 | >200 |
| *Serratia marcescens* | >200 | 164 |

[1] Compounds A and B are the compounds named in footnote 1 of Table I.

The cephalosporin ether antibiotics of this invention are relatively non-toxic substances which are useful in combatting infections in warm blooded mammals when administered parenterally in a pharmaceutically effective non-toxic dosage form. The antibiotic ethers are effective in combatting infections when administered in a dose of about 25 to 50 mg/kg of body weight. In controlling infections in particular hosts repeated administration of smaller doses may suffice while in other instances larger non-toxic doses may be administered to achieve the desired control.

A preferred group of antibiotic compounds of this invention are the 3-methoxy cephalosporins represented by the Formula I wherein R is an acyl group

$R_1$ is methyl and $R_2$ is hydrogen. A particularly preferred group of antibiotics are represented by the Formula I wherein R' is the group

wherein Z is hydroxy, $R_1$ is methyl and $R_2$ is hydrogen. Illustrative of these preferred compounds are 7-(D-mandelamido)-3-methoxy-3-cephem-4-carboxylic acid, 7-(D-4-hydroxymandelamido)-3-methoxy-3-cephem-4-carboxylic acid, 7-(D-3-hydroxymandelamido)-3-methoxy-3-cephem-4-carboxylic acid, 7-[2-(2-thienyl)-2-hydroxyacetamido]-3-methoxy-3-cephem-4-carboxylic acid and 7-[2-(3-thienyl)-2-hydroxyacetamido]-3-methoxy-3-cephem-4-carboxylic acid.

The antibiotic compounds of this invention can be administered in the free acid form or in the form of a pharmaceutically acceptable non-toxic salt such as the sodium or potassium salt. Such salts are prepared by reacting the antibiotic acid with a suitable base such as sodium carbonate, sodium bicarbonate, sodium hydroxide, potassium carbonate and like bases.

The following examples are provided to further illustrate the invention.

EXAMPLE 1 p-Nitrobenzyl 7-amino-3-methylenecepham-4-carboxylate hydrochloride

To a solution of 965 mg. (2 mmole) of p-nitrobenzyl 7-phenoxyacetamido-3-methylenecepham-4-carboxylate in 10 ml. of methylene chloride were added 175 mg of dry pyridine and 460 mg. of phosphorus pentachloride and the mixture was stirred at room temperature for 6 hours. One ml. of isobutanol was added to the mixture which was then stored at 0°C. overnight. The reaction product, p-nitrobenzyl 7-amino-3-methylenecepham-4-carboxylate hydrochloride, which formed as a crystalline precipitate was filtered to yield 430 mg. (58% yield). Elemental Analysis for $C_{15}H_{16}N_3O_5SCl$. Theory: C, 46.69; H, 4.18; N, 10.89. Found: C, 46.40; H, 4.20; N, 10.62.

I.R. (Nujol Mull) Carbonyl absorption at 5.65 ($\beta$-lactam) and 5.75 (ester) microns.

N.M.R. (DMSO $d_6$) signals at 6.34 (2d, 2H, $C_2$-$H_2$), 4.98 (d, 1H, $C_6$-H); 4.7–4.4 (m, 6H, $C_4$-H, ester $CH_2$, $C_4$-$CH_2$ and $C_7$-H); and 2.4–1.6 (m, 4H, aromatic H) tau.

EXAMPLE 2 p-Nitrobenzyl 7-amino-3-methylenecepham-4-carboxylate p-toluenesulfonate salt.

To a solution of 965 mg. of p-nitrobenzyl 7-phenoxyacetamido-3-methylenecepham-4-carboxylate in 10 ml. of methylene chloride were added 175 mg. of dry pyridine and 460 mg. of phosphorus pentachloride and the mixture was stirred for 5 hours at room temperature. Thereafter the reaction mixture was cooled to 0°C. and 50 ml. of cold methanol were added. Following a stirring period of one-hour at room temperature the reaction mixture was evaporated in vacuo to remove the solvents and the residual reaction product mixture was dissolved in a mixture of ethyl acetate and water. The pH was adjusted to pH 7 and the ethyl acetate layer was separated and was washed with water and dried. One-equivalent of p-toluene sulfonic acid was added to the dried solution and on cooling 600 mg.

of p-nitrobenzyl 7-amino-3-methylenecephem-4-carboxylate p-toluenesulfonate formed as a crystalline precipitate. The product was purified by recrystallization from a mixture of 12 ml. of methanol 24 ml. of ether and 15 ml. of petroleum ether.

Elemental analysis for $C_{22}H_{23}N_3O_8S_2$: Theory: C, 50.66; H, 4.45; N, 8.06. Found: C, 50.41; H, 4.51; N, 7.86.

I.R. (Nujol Mull) carbonyl absorption at 5.65 ($\beta$-lactam) and 5.71 (ester) microns N.M.R. (DMSO $d_6$) Signals at 7.70 (s, 3H, p-methyl); 6.39 (s, 2H, $C_2$-$H_2$); 4.98 (d, 1H, $C_6$-H); 4.7-4.3 (m, 6H $C_4$-H, ester $CH_2$; $C_3$-$CH_2$, and $C_7$-H) ; and 2.93–1.68 (m, 8H, aromatic H) tau.

U.V. (pH 6 buffer) Maxima at 219 m$\mu$ ($\epsilon$=19,600) and 268 m$\mu$ ($\epsilon$=0 9,400).

EXAMPLE 3 p-Methoxybenzyl
7-amino-3-methylenecepham-4-carboxylate
hydrochloride

To a solution of 4.3 g. of p-methoxybenzyl 7-phenoxyacetamido-3-methylenecepham-4-carboxylate in 50 ml. of methylene chloride were added 880 mg. of dry pyridine and 2.3 g. of phosphorus pentachloride and the mixture was stirred at the reflux temperature for 3 hours. The reaction mixture was then cooled in an ice-water bath and 5 ml. of isobutanol were added. The mixture was stirred in the cold for several hours during which time 2.2 g. of the reaction product, p-methoxybenzyl 7-amino-3-methylenecepham-4-carboxylate hydrochloride, precipitated from the mixture. The product was filtered and washed with cold methylene chloride and was dried in vacuo.

Elemental analysis for $C_{16}H_{19}N_2O_4SCl$: Theory: C, 51.82; H, 5.16; N, 7.55. Found: C, 51.65; H, 5.04; N, 7.72.

EXAMPLE 4 p-Methoxybenzyl
7-amino-3-methylenecepham-4-carboxylate
p-toluenesulfonate

To a solution of 937 mg. of p-methoxybenzyl 7-phenoxyacetamido-3-methylenecepham-4-carboxylate in 10 ml. of methylene chloride was added 0.18 ml. of dry pyridine and 460 mg. of phosphorus pentachloride. The mixture was stirred at room temperature for 2 hours and was then cooled at 5°C. To the cold mixture was added 50 ml. of cold methanol and the mixture was allowed to warm to room temperature. The reaction mixture was evaporated in vacuo and the residue was dissolved in a mixture of ethyl acetate and water. The pH of the solution was adjusted to pH 7 and the ethyl acetate layer was separated, washed with water and dried. To the dried ethyl acetate layer was added one equivalent of p-toluene sulfonic acid. On cooling 600 mg. of p-methoxybenzyl 3-methylenecepham-4-carboxylate p-toluenesulfonate precipitated as a crystalline solid.

Elemental analysis for $C_{23}H_{26}N_2O_6S_2$: Theory: C, 54.53; H, 5.17; N, 5.53. Found: C, 54.33; H, 5.05; N, 5.47.

I.R. (Nujol Mull): Carbonyl absorption band at 5.65 ($\beta$-lactam) and 5.78 (ester) microns.

N.M.R. (DMSO $d_6$): Signals at 7.69 (s, 3H, para methyl). 6.41 (s, 2H, $C_2$-$H_2$) 6.23 (s, 3H, para methoxy) 5.0 (d, 1H, $C_6$-H) 4.82 (s, 2H, ester $CH_2$) 4.7-4.55 (m, 4H, $C_4$-H, $C_3$-$CH_2$ and $C_7$-H) 3.2-2.0 (m, 8H, aromatic H) tau.

EXAMPLE 5 p-Nitrobenzyl
7-amino-3-hydroxy-3-cephem-4-carboxylate
hydrochloride

A solution of 3.85 g. of p-nitrobenzyl 7-amino-3-methylenecepham-4-carboxylate hydrochloride, prepared as described by Example 1, in 600 ml. of methanol was cooled in an acetone-dry ice bath. Ozone was bubbled through the reaction mixture for approximately 20 minutes at which time the reaction mixture developed a faint blue coloration. Nitrogen was then passed through the reaction mixture to expel excess ozone. Next, the intermediate ozonide was decomposed by passing sulfur dioxide gas through the reaction mixture until the mixture gave a negative potassium iodide-starch test.

The reaction mixture was evaporated in vacuo and the residue was dissolved in 200 ml. of 0.1N hydrogen chloride in methylene chloride. The solution was evaporated to dryness and the residual reaction product was dissolved in acetone. On cooling, 3.15 g. of p-nitrobenzyl 7-amino-3-hydroxy-3-cephem-4-carboxylate hydrochloride precipitated as a crystalline solid.

I.R. (Nujol Mull): Carbonyl absorption at; 5.55 ($\beta$-lactam carbonyl) and; 5.02 (ester carbonyl hydrogen bonded to 3 hydroxy) microns. Electrometric titration (66% DMF) pKa 4.0 and 6.3

EXAMPLE 6 p-Nitrobenzyl
7-amino-3-hydroxy-3-cephem-4-carboxylate
hydrochloride

A solution of 4 g. of p-nitrobenzyl 7-amino-3-methylenecepham-4-carboxylate hydrochloride in 620 ml. of methanol was cooled in a dry ice-acetone bath and ozone was bubbled through the cold solution for about 20 minutes. The reaction mixture was purged of the remaining ozone by passing nitrogen through the solution and 10 g. of sodium bisulfite were added.

The reaction mixture was stirred for one hour at ice-bath temperature at which time the mixture gave a negative potassium iodide starch test.

The mixture was evaporated in vacuo to yield the reaction product as an amorphous yellow residue. The residue was crystallized in acetone to yield 3.4 g. of p-nitrobenzyl 7-amino-3-hydroxy-3-cephem-4-carboxylate hydrochloride as a crystalline acetone solvate.

I.R. (Nujol Mull): Carbonyl absorption bands at 5.60 ($\beta$-lactam) and 6.04 (ester carbonyl hydrogen bonded to 3 hydroxy) microns.

N.M.R. (DMSO $d_6$): signals at 7.92 (s, 3H, 1/2 mole acetone), 6.22 (2d, 2H, $C_2$-$H_2$), 5.07 (d, 1H, $C_6$H), 4.8–4.5 (m, 3H, ester $CH_2$ and $C_7$H), 2.4–1.6 (m, 4H, aromatic H) tau.

EXAMPLE 7 p-Nitrobenzyl
7-amino-3-hydroxy-3-cephem-4-carboxylate
hydrochloride

Following the ozonization procedure described by Examples 5 and 6, 3.85 g. of p-nitrobenzyl 7-amino-3-methylenecepham-4-carboxylate hydrochloride was ozonized in methanol and the intermediate ozonide was decomposed at a temperature of 0°C. with 3.5 ml. of trimethyl phosphite. The reaction mixture was evaporated and the residue was dissolved in 100 ml. of 0.1N HCl in methylene chloride. The said solution was evaporated and the residue was crystallized from acetone to yield 2.8 g. of p-nitrobenzyl 7-amino-3-hydroxy-3-cephem-4-carboxylate hydrochloride.

EXAMPLE 8 p-Nitrobenzyl 7-amino-3-hydroxy-3-cephem-4-carboxylate.

Four millimole of p-nitrobenzyl 7-amino-3-hydroxy-3-cephem-4-carboxylate hydrochloride, prepared as described in Example 5, was dissolved in water and ethyl acetate was added to the solution. The pH of the slurry was adjusted from pH 2.2 to pH 5 with 1N sodium hydroxide. The ethyl acetate layer was separated and was washed with water and dried over magnesium sulfate. The dried ethyl acetate layer was evaporated to dryness to yield 1.2 g. of p-nitrobenzyl 7-amino-3-hydroxy-3-cephem-4-carboxylate as a crystalline residue.

Elemental analysis for: $C_{14}H_{13}N_3O_6S$: Theory: C, 47.86; H, 3.73; N, 11.96. Found: C, 47.87; H, 4.00; N, 12.11.

I.R. (Nujol Mull): Carbonyl absorption at 5.65 (broad, β-lactam and ester) and 6.0 (amide) microns.

N.M.R. (DMSO $d_6$): signals at 6.63 (2d, 2H, $C_2H$), 5.31 (d, 1H, $C_6H$), 4.89 (d, 1H, $C_7H$), 4.62 (s, 2H, ester $CH_2$), 4.30 (broad s, 2H, 7 N-H), 2.5–1.8 (m, 4H, aromatic H) and 1.2 (d, 1H, $C_3OH$) tau.

EXAMPLE 9

Methyl 7-phenoxyacetamido-3-hydroxy-3-cephem-4-carboxylate

A solution of 1.6 g. of methyl 7-phenoxyacetamido-3-methylenecepham-4-carboxylate in 300 ml. of methylene chloride was cooled in an acetone-dry ice bath. Ozone was bubbled through the cold solution for 3 minutes at which time the reaction mixture developed a slight blue coloration. Excess ozone was expelled with a stream of oxygen and 10 g. of sodium bisulfite were added. The reaction mixture was stirred and allowed to warm to 0°C. The liquid phase was separated by decantation and was washed successively with a 5% solution of hydrochloric acid, water and a saturated solution of sodium chloride. The washed mixture was dried and evaporated to yield 1.5 g. of crude methyl 7-phenoxyacetamido-3-hydroxy-3-cephem-4-carboxylate as an amorphous solid.

The crude product was dissolved in ethyl acetate and was extracted with a 5% solution of sodium bicarbonate. Ethyl acetate was added to the extract which was then acidified to pH 2 with 1N hydrochloric acid. The organic phase was separated and washed with a saturated solution of sodium chloride and dried. The dried extract was evaporated to dryness to yield 709 mg. of the reaction product contaminated with a minor amount of the corresponding 3-hydroxy-3-cephem sulfoxide, an over oxidation product. The product was separated from the sulfoxide impurity and obtained pure by preparative thin layer chromatography on silica gel with chloroform:methanol (9:1).

Elemental analysis for: $C_{16}H_{16}N_2O_6S \cdot H_2O$. Theory: C, 50.26; H, 4.75; N, 7.33; S, 8.38. Found: C, 51.03; H, 4.62; N, 7.06; S, 8.37.

I.R. (chloroform): absorption peaks at 2.8 (amide NH), 5.6 (β-lactam carbonyl), 5.85 (broad, amide and ester carbonyl and 6.6 (amide II) microns.

N.M.R. ($CDCl_3$): signals at 6.65 (s, 2H, $C_2$-$H_2$), 6.13 (s, 3H, methyl ester), 5.40 (s, 2H, side-chain $CH_2$), 4.93 (d, 1H, $C_6H$), 4.32 (q, 1H, $C_7H$), 3.15–2.38 (m, 6H, aromatic and amide H), and 1.60 (broad s, 1H, 3-OH) tau.

Electrometric titration (66% aqueous DMF): pKa 5.6.

EXAMPLE 10 p-Methoxybenzyl 7-phenoxyacetamido-3-hydroxy-3-cephem-4-carboxylate.

A solution of 2.5 g. of p-methoxybenzyl 7-phenoxyacetamido-3-methylenecepham-4-carboxylate in 350 ml. of ethyl acetate was cooled in an acetone-dry ice bath. Ozone was bubbled through the cold solution for 8 minutes and then oxygen was passed through the ozonized reaction mixture to expel excess ozone. The intermediate ozonide was decomposed by adding to the reaction mixture 25 g. of sodium bisulfite with stirring at a temperature of about 0°C. The reaction solution was decanted and was washed successively with water, 5% hydrochloric acid and a saturated solution of sodium chloride. The washed mixture was dried and evaporated to yield the reaction product, p-methoxybenzyl 7-phenoxyacetamido-3-hydroxy-3-cephem-4-carboxylate as an amorphous solid.

N.M.R. ($CDCl_3$): signals at 6.73 (s, 2H, $C_2H_2$), 6.23 (s, 3H, p-methoxy), 5.53 (s, 2H, side-chain $CH_2$), 5.03 (d, 1H, $C_6H$), 4.87 (s, 2H, ester $CH_2$), 4.47 (q, 1H, $C_7H$), 3.40–2.50 (m, 9H, aromatic H), 2.33 (d, 1H, amide NH), and 1.53 (broad s, 1H, 3 OH) tau.

EXAMPLE 11 p-Nitrobenzyl 7-[2-(2-thienyl)acetamido]-3-hydroxy-3-cephem-4-carboxylate

To a solution of 1.55 g. of p-nitrobenzyl 7-amino-3-hydroxy-3-cephem-4-carboxylate hydrochloride in 30 ml. of acetone containing 364 mg. (0.5 ml., 3.6 mmole) of triethylamine was added 962 mg. of urea. With stirring at room temperature, a solution of 730 mg. (4.4 mmole) of 2-thiophene acetyl chloride in 20 ml. of acetone was added dropwise to the mixture. After 2.5 hours the reaction mixture was filtered and evaporated. The residue was dissolved in ethyl acetate and the solution was washed successively with water, a 5% solution of sodium bicarbonate, 5% hydrochloric acid, and a saturated solution of sodium chloride. The washed solution was dried and then was concentrated by evaporation in vacuo to yield 1.2 g. of the reaction product as a crystalline residue. The product was recrystallized from ethyl acetate to yield pure p-nitrobenzyl 7-[2-(2-thienyl)acetamido]3-hydroxy-3-cephem-4-carboxylate having the following spectral properties.

I.R. (Nujol Mull): absorption peaks at 3.0 (amide NH), 5.68 (β-lactam carbonyl), and 6.1 (amide, and ester hydrogen bonded to 3 OH) microns.

N.M.R. $CDCl_3$/DMSO $d_6$): signals at 6.54 (2d, 2H, $C_2H_2$), 6.16 (s, 2H, side-chain $CH_2$), 4.90 (d, 1H, $C_6H$) 4.60 (d, 2H, ester $CH_2$), 4.43 (q, 1H, $C_7H$), 3.1–1.6 (m, 7H, aromatic H) and 1.30 (d, 1H, amide NH) tau.

EXAMPLE 12 p-Nitrobenzyl 7-[2-(2-thienyl)acetamido]-3-hydroxy-3-cephem-4-carboxylate.

p-Nitrobenzyl 7-amino-3-methylenecepham-4-carboxylate, 3.85 g., was reacted with ozone in methanol as described in Example 5 to provide the ozonide. The ozonide was decomposed with sulfur dioxide to produce the 3-hydroxy product which was isolated as crude product. The crude 3-hydroxy-3-cephem nucleus ester was dissolved in 175 ml. of tetrahydrofuran and 50 ml. of water. Sodium bisulfite, 2.1 g., was suspended in the solution and a solution of 4.8 g. of 2-thiophene acetyl chloride in 200 ml. of THF was added dropwise to the suspension.

The mixture was stirred for two hours at room temperature and was then evaporated to an aqueous residue. The residue was slurried with ethyl acetate, the organic layer separated and washed with 5% hydrochloric acid and with water. The washed layer was dried and evaporated to dryness to yield the reaction product as a crystalline residue. The residue was triturated three times with diethyl ether to remove contaminating 2-thiophene acetic acid and to provide 2.9 g. of the purified crystalline product, p-nitrobenzyl 7-[2-(2-thienyl)acetamido]-3-hydroxy-3-cephem-4-carboxylate.

Electrometric titration (66% aqueous DMF) pka 5.9.
N.M.R. ($CDCl_3/D_2O$): signals at 6.60 (s, 2H, $C_2H_2$), 6.13 (s, 2H, side-chain $CH_2$), 4.96 (d, 1H, $C_6H$), 4.62 (d, 2H, ester $CH_2$), 4.46 (d, 1H, $C_7H$) and 3.1–1.7 (m, 7H, aromatic H) tau.

EXAMPLE 13 p-Nitrobenzyl 7-acetamido-3-hydroxy-3-cephem-4-carboxylate

A solution of 10 mmole of p-nitrobenzyl 7-amino-3-hydroxy-3-cephem-4-carboxylate hydrochloride in a mixture of 325 ml. of acetone and 125 ml. of water was cooled in an ice-water bath. With stirring a stream of ketene gas was bubbled through the solution for 30 minutes. Thereafter the reaction mixture was evaporated to remove acetone and the aqueous residue was slurried with ethyl acetate. The ethyl acetate layer was separated and was washed with 5% hydrochloric acid and a saturated solution of sodium chloride. The washed extract was dried and evaporated in vacuo to yield the reaction product as a crystalline residue. The residue was triturated with diethyl ether and vacuum dried to yield 3.55 g. of p-nitrobenzyl 7-acetamido-3-hydroxy-3-cephem-4-carboxylate melting at about 146–152°C. with decomposition.

Elemental analysis for: $C_{16}H_{15}N_3O_7S$: Theory: C, 48.85; H, 3,84; N, 10.68, Found: C, 48.97; H, 3.96; N, 10.42.

I.R. ($CHCl_3$): absorption bands at 2.9 and 3.0 (amide NH and OH), 5.63 ($\beta$-lactam carbonyl) and 5.95 (broad, amide, and ester carbonyl hydrogen bonded to 3 OH) microns.

N.M.R. ($CDCl_3$): signals at 7.90 (s, 3H, 7-acetamido $CH_3$), 6.55 (s, 2H, $C_2H_2$), 4.92 (d, 1H, $C_6H$), 4.63 (m, 2H, ester $CH_2$), 4.30 (q, 1H, $C_7H$), 2.81 (d, 1H, amide NH), 2.5–1.8 (m, 4H, aromatic H), and 2,8 (s, 1H, $C_3$ OH) tau.

Electrometic titration (66% aqueous DMF) pKa 5.9

EXAMPLE 14 p-Nitrobenzyl 7-phenylacetamido-3-hydroxy-3-cephem-4-carboxylate

Following the ozonization procedures described in Example 9, a solution of 350 mg. of p-nitrobenzyl 7-phenylacetamido-3-methylenecepham-4-carboxylate in 250 ml. of methylene chloride was cooled to −78°C. and was ozonized. The intermediate ozonide was decomposed in situ with sulfur dioxide and the reaction product was recovered and obtained crystalline by extraction with ethyl acetate.

Elemental analysis for $C_{22}H_{19}N_3O_7S$: Theory: C, 56.28; H, 4.80; N, 8.95. Found: C, 56.11; H, 4.15; N, 8.74.

N.M.R. ($CDCl_3$): signals at 6.68 (2d, 2H, $C_2H_2$), 6.37 (s, 2H, side-chain $CH_2$), 5.03 (d, 1H, $C_6H$), 4.66 (d, 2H, ester $CH_2$), 4.40 (q, 1H, $C_7H$), 2.7 (m, 6H, amide NH and aromatic H), 2.53–1.70 (q, 4H, aromatic H) and a singlet in low field integrating for 1H of $C_3$ hydroxyl group tau.

I.R. (Nujol Mull): absorption peaks at 3.04 (amide), 5.60 and 6.0 ($\beta$-lactam, ester and amide carbonyls) microns.

EXAMPLE 15 p-Nitrobenzyl 7-(D-$\alpha$-phenyl-$\alpha$-formyloxyacetamido)-3-hydroxy-3-cephem-4-carboxylate.

To a solution of 1.54 g. of p-nitrobenzyl 7-amino3-hydroxy-3-cephem-4-carboxylate hydrochloride in 120 ml. of acetone and 40 ml. of water was added 936 mg. of sodium bisulfite. With stirring a solution of 960 mg. of O-formyl-D-mandelic acid chloride in 20 ml. of anhydrous acetone was added dropwise at room temperature. The reaction mixture was stirred at room temperature for 16 hours and was then evaporated to remove acetone. The aqueous residue was slurried with ethyl acetate and the organic layer separated. The extract was washed with water was dried and evaporated. The crystalline residue was triturated with diethyl ether and dried to yield 1 g. of p-nitrobenzyl 7-(D-$\alpha$-phenyl-$\alpha$-formyloxyacetamido)-3-hydroxy-3-cephem-4-carboxylate.

Elemental analysis for $C_{23}H_{19}N_3O_9S$: Theory: C, 53.80; H, 3.73; N, 8.18. Found: C, 53.51; H, 3.81; N, 8.46

I.R. ($CHCl_3$): carbonyl absorption peaks at 5.55, 5.73, 5.85 and 5.93 microns.

N.M.R. ($CDCl_3$): signals at 6.61 (s, 2H, $C_2H_2$), 4.95 (d, 1H, $C_6H$), 4.61 (d, 2H, ester $CH_2$), 4.39 (q, 1H, $C_7H$), 3.70 (s, 1H, $\alpha$-CH), and 2.80-1.70 (m, 11H, amide NH and aromatic H) tau.

EXAMPLE 16 p-Nitrobenzyl 7-amino-3-methoxy-3-cephem-4-carboxylate

To a stirred suspension of 445 mg. of p-nitrobenzyl 7-amino-3-hydroxy-3-cephem-4-carboxylate hydrochloride (prepared as described by Example 5) in 35 ml. of dry tetrahydrofuran was added one equivalent of triethylamine followed by 10 ml. of an ethereal solution of diazomethane in excess. After 30 min. the solvent and excess diazomethane were evaporated and the residue was dissolved in a mixture of water and ethyl acetate. The organic layer was separated and was washed with water and dried. The dried ethyl acetate solution was evaporated to dryness to yield 310 mg. of p-nitrobenzyl 7-amino-3-methoxy-3-cephem-4-carboxylate. The product was obtained crystalline by trituration with diethyl ether.

Elemental analysis for $C_{15}H_{15}N_3O_6S$: Theory: C, 49.31; H, 4.14; N, 11.50. Found: C, 49.51; H, 4.40; N, 11.25.

I.R. (Nujol Mull): absorption peaks at 2.99 (amide), 5.75 (broad, β-lactam and ester carbonyl), and 5.98 (amide carbonyl) microns.

U.V. (ethanol) absorption maximum 268 mµ, ∈=14,600.

N.M.R. (DMSO $d_6$): signals at 7.10 (broad s, 2H, $C_7NH_2$), 6.22 (s, 2H, $C_2$-$H_2$), 6.20 (s, 3H, $C_3$ methexyl), 5.27 (d, 1H, $C_6H$), 4.93 (d, 1H, $C_7H$), 4.60 (s, 2H, ester $CH_2$), and 2.35–1.6 (q, 4H, aromatic H) tau.

EXAMPLE 17 p-Nitrobenzyl 7-amino-3-methoxy-3-cephem-4-carboxylate hydrochloride.

To a stirred suspension of 445 mg. of p-nitrobenzyl 7-amino-3-hydroxy-3-cephem-4-carboxylate hydrochloride in 30 ml. of methylene chloride was added 131 mg. of mono-trimethylsilyl acetamide and the mixture was stirred at room temperature for 30 min. An ethereal solution of excess diazomethane was added and after 20 min. the mixture was evaporated to remove solvent and excess diazomethane. The residue was treated with 1 ml. of methanol and then dissolved in an ethyl acetate-water mixture. The ethyl acetate layer was separated, washed with water and dried. Hydrogen chloride was passed through the dried ethyl acetate layer to precipitate the reaction product, p-nitrobenzyl 7-amino-3-methoxy-3-cephem-4-carboxylate hydrochloride.

N.M.R. (DMSO $d_6$): signals at 6.97 (broad s, 3H, $NH_3^+$), 6.31 (s, 2H, $C_2$-$H_2$), 6.23 (s, 3H, $C_3$ methoxyl), 5.39 (d, 1H, $C_6H$), 5.05 (d, 1H, $C_7H$) and 2.5–1.92 (q, 4H, aromatic H) tau.

EXAMPLE 18 p-Nitrobenzyl 7-(D-α-phenyl-α-formyloxyacetamido)-3-methoxy-3-cephem-4-carboxylate To a solution of 500 mg. of p-nitrobenzyl 7-(D-α-phenyl-α-formyloxyacetamido)-3-hydroxy-3-cephem-4-carboxylate (prepared as described by Example 15) in 20 ml. of methylene chloride was added a solution of excess diazomethane in diethyl ether. After 20 min. the mixture was evaporated and the residue was triturated with ether to provide the crystalline product, p-nitrobenzyl 7-(D-α-phenyl-α-formyloxyacetamido)-3-methoxy-3-cephem-4-carboxylate in a 48% yield.

Elemental analysis for $C_{24}H_{21}N_3O_9S$: Theory: C, 54.65; H, 4.01; N, 7.97. Found: C, 54.43; H, 4.23; N, 7.99.

EXAMPLE 19 p-Nitrobenzyl 7-[2-(2-thienyl)acetamido]-3-methoxy-3-cephem-4-carboxylate

To a solution of 2 g. of p-nitrobenzyl 7-[2-(2-thienyl)acetamido]-3-hydroxy-3-cephem-4-carboxylate (prepared as described by Example 11) in 50 ml. of methylene chloride was added excess diazomethane in methylene chloride and the reaction mixture was allowed to stand for 2 hours at room temperature. The reaction mixture was evaporated and the residue was dissolved in ethyl acetate. The ethyl acetate solution was allowed to stand in the cold for 16 hours to precipitate 750 mg. of crystalline product.

Elemental analysis for: $C_{21}H_{19}N_3O_7S_2$. Theory: C, 51.53; H, 3.91; N, 8.58; S, 13.10; O, 22.88. Found: C, 51.49; H, 3.76; N, 8.49; S, 12.90; O, 23.03.

Methoxyl determination: Theory: 6.33%. Found: 6.09%.

I.R. (Nujol Mull): absorption peaks at 3.02 (amide NH), 5.65, 5.75 and 6.01 (β-lactam, and ester and amide carbonyl respectively) microns.

N.M.R. (CDCl$_3$): signals at 6.62 (s, 2H, $C_2H_2$), 6.18 (s, 3H, $C_3$ methoxyl), 6.16 (s, 2H, side-chain $CH_2$), 4.98 (d, 1H, $C_6H$), 4.71 (d, 2H, ester $CH_2$), 4.42 (q, 1H, $C_{7H}$), 3.19 (d, 1H, amide NH) and 3.1–1.65 (m, 7H, aromatic H) tau.

U.V. (ethanol: absorption maxima: λ max 237 mµ, ∈=15,400; λ max 268 mµ, Γ=16,000

EXAMPLE 20

Methyl 7-phenoxyacetamido-3-methoxy-3-cephem-4-carboxylate.

To a solution of 107 mg. of methyl 7-phenoxyacetamido-3-hydroxy-3-cephem-4-carboxylate (prepared as described by Example 9) in 10 ml. of methylene chloride was added excess diazomethane in methylene chloride. After 30 min. the reaction mixture was evaporated and the residue was dissolved in ethyl acetate. The solution was washed with water and dried. Evaporation of the dried solution gave the product, methyl 7-phenoxyacetamido-3-methoxy-3-cephem-4-carboxylate having the following spectral properties.

I.R. (CHCl$_3$): absorption bands at 2.9 (amide NH), 5.60 (β-lactam carbonyl), 5.70 (ester carbonyl), and 5.91 (amide carbonyl) microns.

N.M.R. (CDCl$_3$): signals at 6.60 (s, 2H, $C_2H_2$), 6.20 (s, 3H, methyl ester $CH_3$), 6.13 (s, 3H, $C_3$ methoxyl), 5.43 (s, 2H, side-chain $CH_2$), 4.93 (d, 1H, $C_6H$) 4.40 (q, 1H, $C_7H$), 3.27–2.47 (m, 5H, aromatic H) and 2.22 (d, 1H, amide NH) tau.

U.V. (ethanol):λ max 268 mµ, ∈=7,800.

EXAMPLE 21 p-Methoxybenzyl 7-phenoxyacetamido-3-methoxy-3-cephem-4-carboxylate

To a solution of 1.5 g. of p-methoxybenzyl 7-phenoxyacetamido-3-hydroxy-3-cephem-4-carboxylate (prepared as described by Example 10) in methylene chloride was added excess diazomethane in methylene chloride followed by two drops of boron trifluoride etherate to catalyze the etherification. The reaction mixture was stirred at room temperature for 1.5 hr. and was then evaporated in vacuo. The residue was dissolved in ethyl acetate and the solution was washed successively with water, 5% hydrochloric acid, a 5% solution of sodium bicarbonate and a saturated solution of sodium chloride. The washed solution was dried and evaporated to yield 1.5 g. of crude product.

The product was purified by preparative thin layer chromatography over silica gel with a 7;3 benzene-ethyl acetate solvent system.

Elemental analysis for $C_{24}H_{24}N_2O_7S$: Theory: C, 59.49; H, 4.99; N, 5.78; S, 6.62. Found: C, 59.35; H, 5.16; N, 5.56; S, 6.68.

I.R. ($CHCl_3$); absorption bands at 2.95 (amide NH), 5.6 and 5.9 (broad, $\beta$-lactam carbonyl, and ester and amide carbonyls).

N.M.R. ($CDCl_3$): signals at 6.73 (s, 2H, $C_2H_2$), 6.23 (s, 6H, p-$OCH_3$ and 3 $OCH_3$), 5.45 (s, 2H, side-chain $CH_2$), 5.00 (d, 1H, $C_6H$), 4.85 (s, 2H, ester $CH_2$), 4.47 (q, 1H, $C_7H$), 3.33–2.50 (m, 9H, aromatic H) and 2.25 (d, 1H, amide NH) tau.

U.V. (ethanol) $\lambda$ max 268 m$\mu$, $\epsilon$=5,000 $\lambda$ max 220 m$\mu$, $\epsilon$=14,000.

EXAMPLE 22 p-Nitrobenzyl 7-acetamido-3-methoxy-3-cephem-4-carboxylate.

Following the methylation procedure described by Example 21, p-nitrobenzyl 7-acetamido-3-hydroxy-3-cephem-4-carboxylate (prepared as described by Example 13) was reacted with diazomethane to provide crystalline p-nitrobenzyl 7-acetamido-3-methoxy-3-cephem-4-carboxylate.

Elemental analysis for: $C_{17}H_{17}N_3O_7S$: Theory: C, 50.12; H, 4.21; N, 10.31. Found: C, 50.09; H, 4.20; N, 10.59.

I.R. (Nujul Mull): carbonyl absorption at 5.64 and 5.9 microns.

N.M.R. (DMSO $d_6$): signals at 8.05 (s, 3H, 7-acetamido $CH_3$), 6.30( s, 2H, $C_2H_2$), 6.10 ) s, 3H, methoxyl), 4.91 (d, 1H, $C_6H$), 4.60 (s, 2H, ester $CH_2$), 4.53 (q, 1H, $C_7H$) and 2.4–1.8 (m, 4H, aromatic H) tau.

U.V. (ethanol) $\lambda$ max 265 m$\mu$, $\epsilon$=16,400

EXAMPLE 23 p-Nitrobenzyl 7-phenoxyacetamido-3-methoxy-3-cephem-4-carboxylate

Following the etherification procedure described by Example 22, p-nitrobenzyl 7-phenoxyacetamido-3-hydroxy-3-cephem-4-carboxylate (prepared as described by Example 14) was reacted with diazomethane to provide after crystallization from ether and warm benzene, crystalline p-nitrobenzyl 7-phenoxyacetamido-3-methoxy-3-cephem-4-carboxylate.

N.M.R. ($CDCl_3$): signals at 6.62 (s, 2H, $C_2H$), 6.20 (s, 3H, $C_3$ methoxyl), 5.46 (s, 2H, side-chain $CH_2$), 4.98 (d, 1H, $C_6H$), 4.72 (d, 2H, ester $CH_2$), 4.44 (q, 1H, $C_7H$), and 3.2–1.7 (m, 10 H, aromatic H and amide NH) tau.

EXAMPLE 24

7-(D-Mandelamido)-3-methoxy-3-cephem-4-carboxylic acid.

A solution of 528 mg. of p-nitrobenzyl 7-(D-$\alpha$-phenyl-$\alpha$-formyloxyacetamido)-3-methoxy-3-cephem-4-carboxylate (prepared as described in Example 18) in 20 ml. of acetonitrile and 60 ml. of methanol containing 3 drops of 1N hydrochloric acid was hydrogenated in the presence of 530 mg. of 5% palladium-on-carbon (pre-reduced in ethanol) under 50 psi hydrogen pressure for 2.5 hr. at room temperature.

The catalyst was filtered and washed with THF and water. The filtrate and washes were combined and evaporated to remove solvents. The aqueous concentrate was slurried with ethyl acetate and the pH of the slurry was momentarily adjusted to pH 10 with 1N sodium hydroxide. The pH was immediately readjusted to pH 7 with 1N hydrochloric acid. The aqueous phase was separated, washed with ethyl acetate and cooled in an ice bath. Ethyl acetate was added to the cold solution and the pH was adjusted to pH 2.5 with 1N hydrochloric acid. The ethyl acetate layer was separated and was washed with water and dried.

The dried solution was evaporated to dryness and the residue was triturated with diethyl ether to provide 115 mg. of 7-(D-mandelamido)-3-methoxy-3-cephem-4-carboxylic acid as a crystalline solid.

Elemental analysis for $C_{16}H_{16}N_2O_6S$: Theory: C, 52.74; H, 4.43; N, 7.69. Found: C, 52.76; H, 4.30; N, 7.46.

I.R. (Nujol Mull): absorption peaks at 3.0 (broad, amide NH and $\alpha$-OH), 5.55, 5.84, 6.1 ($\beta$-lactam, carboxylic acid and amide carbonyls respectively) and 6.55 (amide II band) microns.

N.M.R. (DMSO $d_6$): signals at 6.36 (s, 2H, $C_2H_2$), 6.23 (s, 3H, $C_3$ methoxyl), 4.98-4.45 (m, 3H, $C_6H$ side-chain CH and $C_7$-H), 3.80 (broad s, 1H, side chain OH, washed out with $D_2O$), 2.78–2.38 (m, 5H, aromatic H), and 1.45 (d, 1H, amide H) tau.

EXAMPLE 25

7-(D-Mandelamido)-3-methoxy-3-cephem-4-carboxylic acid.

A solution of 528 mg. of p-nitrobenzyl 7-(D-$\alpha$-phenyl-$\alpha$-formyloxyacetamido)-3-methoxy-3-cephem-4-carboxylate in 7 ml. of acetonitrile was cooled in an ice bath and 1 ml. of concentrated hydrochloric acid was added. Next 260 mg. of zinc dust were added portionwise with stirring and the reaction mixture was stirred in the cold for 30 min. and at room temperature for 2 hours.

The reaction mixture was poured into a mixture of water and ethyl acetate and the ethyl acetate layer was separated, washed with water and dried. The dried solution was evaporated to dryness to yield crude, 7-(D-$\alpha$-phenyl-$\alpha$-formyloxyacetamido)-3-methoxy-3-cephem-4-carboxylic acid.

The crude acid was dissolved in 15 ml. of a 5% solution of sodium bicarbonate and the solution was extracted with ethyl acetate. The aqueous solution was allowed to stand for 2 hours and was then slurried with ethyl acetate. The slurry was cooled to 5°C. and was acidified with 1N hydrochloric acid to pH 2. The ethyl acetate layer was separated, washed with water, dried and evaporated to dryness. The residue was triturated with diethyl ether to obtain the reaction product, 7-(D-mandelamido)-3-methoxy-3-cephem-4-carboxylic acid having spectral properties in agreement with those of the product obtained by Deblocking Method A of Example 28.

EXAMPLE 26

7-Amino-3-methoxy-3-cephem-4-carboxylic acid.

A solution of 730 mg. of p-nitrobenzyl 7-amino-3-methoxy-3-cephem-4-carboxylate in 20 ml. of water and 20 ml. of acetonitrile was acidified momentarily to pH 1 with concentrated hydrochloric acid. Immediately thereafter the solution was back titrated to pH 2.5 with 1N sodium hydroxide. The solution was then evaporated to dryness and the residue was dissolved in a mixture of 40 ml. THF, 80 ml. of methanol and 6 ml. of water. The solution was then hydrogenated in the presence of 730 mg. of 5% palladium-on-carbon (pre-reduced in ethanol) for 2 hours under 50 psi hydrogen pressure at room temperature.

The catalyst was filtered and washed with THF and water. The combined washes and filtrate were evaporated and the aqueous residue was slurried with ethyl acetate. The pH of the slurry was adjusted to pH 3.5 and the aqueous layer was separated and washed with ethyl acetate. The aqueous layer was concentrated to a volume of 4 ml. and was then cooled to precipitate 160 mg. of 7-amino-3-methoxy-3-cephem-4-carboxylic acid as a crystalline solid.

Elemental analysis for $C_8H_{10}N_2O_4S$: Theory: C, 41.73; H, 4.38; N, 12.17. Found: C, 43.45; H, 4.50; N, 12.52.

I.R. (Nujol Mull): absorption peaks at 5.61 microns ($\beta$-lactam carbonyl).

N.M.R. (DMSO $d_6$): signals at 6.35 (s, 2H, $C_2H_2$), 6.20 (s, 3H, $C_3$ methoxyl), 5.30 (d, 1H, $C_6H$) and 4.94 (d, 1H, $C_7H$) tau.

U.V. (pH 7 buffer): $\lambda$ max 268m$\mu$, $\epsilon$=6,500

EXAMPLE 27

7-Phenoxyacetamido-3-methoxy-3-cephem-4-carboxylic acid.

To a solution of 176 mg. of p-methoxybenzyl-7-phenoxyacetamido-3-methoxy-3-cephem-4-carboxylate in 10 ml. of benzene containing 50 mg. of anisole was added 770 mg. of trifluoroacetic acid. The mixture was stirred at room temperature for 45 min. and was then evaporated in vacuo. The residual oil was dissolved in ethyl acetate and the solution washed with water. Water was added and the mixture was titrated to pH 6.5 with 0.1N sodium hydroxide. The aqueous phase was separated and layered with ethyl acetate. The mixture was back titrated to ph 2.8 with hydrochloric acid in the cold. The organic layer was separated, washed with water, dried and evaporated to dryness to yield 54 mg. of 7-phenoxyacetamido-3-methoxy-3-cephem-4-carboxylic acid as an amorphous solid.

I.R. ($CHCl_3$): absorption peaks at 2.95 (amide NH), 5.60 ($\beta$-lactam carbonyl), 5.89 (broad, amide and carboxylic acid carbonyl), and 6.5 (amide II) microns.

N.M.R. ($CDCl_3$): signals at 6.77 (s, 2H, $C_2H_2$), 6.13 (s, 3H, $C_3$ methoxyl), 5.47 (s, 2H, side-chain $CH_2$), 4.97 (d, 1H, $C_6H$), 4.50 (q, 1H, $C_7H$), 3.30–2.53 (m, 5H, aromatic H), 2.33 (d, 1H, amide NH) and 1.5 (broad s, 1H, $C_4$ COOH) tau.

EXAMPLE 28 p-Nitrobenzyl 7-[2-(2-thienyl)acetamido]-3-methoxy-3-cephem-4-carboxylate

To a solution of 2.4 g. of p-nitrobenzyl 7-amino-3-methoxy-3-cephem-4-carboxylate (Example 16) in 50 ml. of acetone was added 1.7 g. of sodium bicarbonate. The suspension was stirred while 1.15 g. of thiophene-2-acetyl chloride in dry acetone was added dropwise over 45 min. After stirring for 30 min. the reaction mixture was evaporated and the residue dissolved in a mixture of water and ethyl acetate. The organic layer was separated, washed with water, dried and was then evaporated to a concentrate. On cooling 1.9 g. of p-nitrobenzyl 7-[2-(2-thienyl)acetamido]-3-methoxy-3-cephem-4-carboxylate crystallized from the concentrate.

N.M.R. ($CDCl_3$/DMSO $d_6$): signals at 6.41 (s, 2H, $C_2H_2$), 6.15 (s, 2H, side-chain $CH_2$), 6.10 (s, 3H, $C_3$ methoxyl), 4.91 (d, 1H, $C_6H$), 4.7–4.35 (m, 3H, ester $CH_2$, $C_7H$), 3.1–1.7 (m, 7H, aromatic H) and 1.0 (d, 1H, $C_7$ NH) tau.

U.V. (ethanol) $\lambda$ max 260 m$\mu$, $\epsilon$=15,000; $\lambda$ max 235 m$\mu$, $\epsilon$=16,200.

EXAMPLE 29

7-[2-(2-Thienyl)acetamido]-3-methoxy-3-cephem-4-carboxylic acid

A solution containing 490 mg. of the p-nitrobenzyl ester product of Example 28, 20 ml. of THF, 60 ml. of methanol and 5 drops of 1N hydrochloric acid was hydrogenated in the presence of 490 mg. of 5% Pd-on-C (pre-reduced in ethanol) for 2.5 hr. under 50 psi hydrogen pressure at room temperature.

The catalyst was filtered and washed with THF and water. The combined filtrate and washes were evaporated and the pH of the aqueous residue was adjusted to pH 2.5. The residue was extracted with ethyl acetate and water was added to the extract. The pH of the mixture was adjusted to pH 7 and the aqueous phase was separated and slurried with ethyl acetate. The slurry was acidified to pH 2.5 and the organic layer was separated, washed with water, dried and evaporated, washed with water, dried and evaporated to dryness. The residue was triturated with diethyl ether to yield 156 mg. of 7-[2-(2-thienyl)acetamido]-3-methoxy-3-cephem-4-carboxylic acid as a crystalline solid melting at about 168–171°C. with decomposition.

Elemental analysis for $C_{14}H_{14}N_2O_5S_2$: Theory: C, 47.45; H, 3.98; N, 7.90. Found: C, 47.52; H, 4.20; N, 742.

N.M.R. (DMSO $d_6$): signals at 6.35 (s, 2H, $C_2H_2$), 6.24 (s, 5H, $C_3$ methanoxyl and side-chain $CH_2$), 4.94 (d, 1H, $C_6H$), 4.55 (q, 1H, $C_7H$), 3.10–2.55 (m, 3H, aromatic H) and 1.10 (d, 1H, amide NH)tau.

EXAMPLE 30 p-Nitrobenzyl 7-(D-mandelamido)-3-methoxy-3-cephem-4-carboxylate

To a suspension of 365 mg. of p-nitrobenzyl 7-amino-3-methoxy-3-cephem-4-carboxylate in 20 ml. of ethyl acetate was added 200 mg. of mandelic o-carboxy anhydride. Next a solution of 200 mg. of sodium bisulfite in 20 ml. of water was added and the two-phase mixture was vigorously stirred for 30 min.

The ethyl acetate layer was separated, washed with water, dried and evaporated to dryness. The residue was triturated with diethyl ether to yield 350 mg. of crystalline product.

N.M.R. ($CDCl_3$/$D_2O$): signals at 6.70 (s, 2H, $C_2H_2$), 6.22 (s, 3H, $C_3$ methoxyl), 5.06 (d, 1H, $C_6H$), 4.90 (s, 1H, side-chain CH), 4.75 (d, 2H, ester $CH_2$), 4.58 (q, 1H, $C_7H$), and 2.66–1.75 (m, 9H, aromatic H) tau.

Elemental analysis for $C_{23}H_{21}N_3O_8$: Theory: C, 55.31; H, 4.24; N, 8.41. Found: C, 55.07; H, 4.17; N, 8.13.

EXAMPLE 31 p-Nitrobenzyl 7-(D-α-phenyl-α-formyloxyacetamido)-3-methoxy-3-cephem-4-carboxylate To a solution of 4 g. of p-nitrobenzyl 7-amino-3-methoxy-3-cephem-4-carboxylate in 50 ml. of acetone was added 2.8 g. of sodium bicarbonate. To the suspension was added dropwise with stirring a solution of 2.3 of D-α-formyloxyphenylacetyl chloride in dry acetone. The acylation was complete in 1 hour as evidenced by thin layer chromatography.

The reaction mixture was evaporated under reduced pressure and the residue dissolved in a mixture of water and ethyl acetate. The organic layer was separated, washed with a cold 5% hydrochloric acid, dried and then evaporated. The residual oil was slurried with diethyl ether to yield 4.8 g. of crystalline product.

Elemental analysis for $C_{24} H_{21} N_3O_9S$: Theory: C, 54.65; H, 4.01; N, 7.97. Found: C, 54.47; H, 4.06; N, 7.75.

N.M.R. (CDCl$_3$): signals at 6.68 (s, 2H, $C_2H_2$), 6.20 (s, 3H, $C_3$ methoxyl), 4.99 (d, 1H, $C_6$H), 4.71 (d, 2H, ester CH$_2$), 4.48 (q, 1H, $C_7$H), 3.74 (s, 1H, α-CH), and 2.75–1.75 (m, 11H, amide NH, o-formyl, and aromatic H) tau.

I.R. (CHCl$_3$): absorption peaks at 2.9 (amide), 5.58, 5.74 and 5.82 (broad, β-lactam, ester and amide carbonyls) microns.

EXAMPLE 32

7-[5-(2,4-dichlorobenzamido)-5-carboxyvaleramido]-3-methoxy-3-cephem-4-carboxylic acid dibenzhydryl ester.

A solution of 7-[5-(2,4-dichlorobenzamido)-5-carboxyvaleramido]-3-exomethylenecepham-4-carboxylic acid dibenzhydryl ester in methylene chloride is cooled to −78°C. in a dry ice-acetone bath and ozone is bubbled through the mixture to form the ozonide. Thereafter the reaction mixture is purged of excess ozone by passing nitrogen through the cold mixture. The reaction mixture is then treated with excess gaseous sulfur dioxide to decompose the ozonide and provide 7-[5-(2,4-dichlorobenzamido)-5-carboxyvaleramido]-3-hydroxy-3-cephem-4-carboxylic acid dibenzhydryl ester.

To a solution of the 3-hydroxy diester in methylene chloride is added a solution of diazomethane in methylene chloride containing excess diazomethane. The etherification mixture is allowed to stand for 2.5 hours at 25°C. to provide the etherification product, 7-[5-(2,4-dichlorobenzamido)-5-carboxyvaleramido]-3-methoxy-3-cephem-4-carboxylic acid dibenzhydryl ester.

EXAMPLE 33

Benzhydryl 7-amino-3-methoxy-3-cephem-4-carboxylate hydrochloride

To a solution of 7-[5-(2,4-dichlorobenzamido)-5-carboxyvaleramido]-3-methoxy-3-cephem-4-carboxylic acid dibenzhydryl ester in methylene chloride maintained at 0°–5°C. is added dry pyridine and phosphorus pentachloride in methylene chloride and the reaction mixture is stirred for 3 hours. To the cold reaction mixture is added with stirring an excess of sec-butanol. The precipitate of benzhydryl 7-amino-3-methoxy-3-cephem-4-carboxylate hydrochloride is filtered and can be purified by recrystallization.

I claim:
1. A compound of the formula

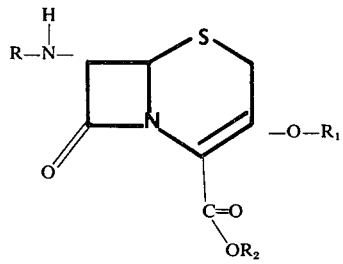

wherein R is hydrogen, or an acyl group of the formula

wherein R' is
a. $C_1$-$C_7$ alkyl, $C_3$-$C_7$ alkenyl, cyanomethyl, halomethyl, 4-amino-4-carboxybutyl, 4-protected amino-4-carboxybutyl; or
b. the group R'' wherein R'' is 1,4-cyclohexadienyl, phenyl, or phenyl substituted by halogen, hydroxy, nitro, amino, cyano, $C_1$-$C_4$ lower alkyl, $C_1$-$C_4$ lower alkoxy, hydroxymethyl, aminomethyl, protected aminomethyl, carboxy or carboxymethyl; or
c. an arylalkyl group of the formula R''—(Y)$_m$—CH$_2$—
wherein R'' is as defined above,
Y is O or S,
m is 0 or 1; or
d. a substituted arylalkyl group of the formula

wherein R''' is R'' as defined above, 2-thienyl or 3-thienyl, Z is hydroxy or protected hydroxy; or
e. a heteroarylmethyl group of the formula R''''λ'—CH$_2$—
wherein R'''' is 2-thienyl, 3-thienyl, 2-furyl, 3-furyl, 2-thiazyl, 2-oxazyl, 5-tetrazyl or 1-tetrazyl;
and wherein
$R_1$ is hydrogen, methyl, ethyl, 3-methyl-2-butenyl or diphenylmethyl;
$R_2$ is hydrogen or a carboxylic acid protecting ester forming group;
and when $R_2$ is hydrogen, the pharmaceutically acceptable nontoxic salts thereof;
with the limitation that when $R_1$ is hydrogen, $R_2$ is a carboxylic acid protecting ester forming group.

2. The compound of claim 1 wherein R is an acyl group

and $R_1$ is methyl.

3. The compound of claim 2 wherein R' is 4-amino-4-carboxybutyl.

4. The compound of claim 2 wherein R' is 4-(2,4-dichlorobenzamido)-4-diphenylmethyloxycarbonylbutyl.

5. The compound of claim 2 wherein R' is 4-propionamido-5-diphenylmethyloxycarbonylbutyl.

6. The compound of claim 2 wherein R' is methyl.

7. The compound of claim 2 wherein R' is a group of the formula $$R''-(Y)_m-CH_2-.$$

8. The compound of claim 7, said compound being 7-phenoxyacetamido-3-methoxy-3-cephem-4-carboxylic acid.

9. The compound of claim 7, said compound being 7-phenylacetamido-3-methoxy-3-cephem-4-carboxylic acid.

10. The compound of claim 2 wherein R' is a group of the formula

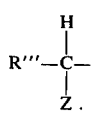

11. The compound of claim 10, said compound being 7--mandelamido-3-D-mandelamido-3-cephem-4-carboxylic acid.

12. The compound of claim 10, said compound being 7-(D-α-phenyl-α-formyloxyacetamido-3-methoxy-3-cephem-4-carboxylic acid.

13. The compound of claim 2 wherein R' is an acyl group of the formula $$R''''-CH_2-.$$

14. The compound of claim 13, said compound being 7-[2-(2-thienyl)acetamido]-3-methoxy-3-cephem-4-carboxylic acid.

15. The compound of claim 13, said compound being p-nitrobenzyl 7-[2-(2-thienyl)acetamido]-3-methoxy-3-cephem-4-carboxylate.

16. The compound of claim 1 wherein R is an acyl group of the formula

and $R_1$ is hydrogen.

17. The compound of claim 16, said compound being p-nitrobenzyl 7-phenylacetamido-3-hydroxy-3-cephem-4-carboxylate.

18. The compound of claim 16, said compound being p-nitrobenzyl 7-[2-(2-thienyl)acetamido]-3-hydroxy-3-cephem-4-carboxylate.

19. The compound of claim 16, said compound being p-methoxybenzyl 7-phenoxyacetamido-3-hydroxy-3-cephem-4-carboxylate.

20. The compound of claim 16, said compound being p-nitrobenzyl 7-(D-α-phenyl-α-formyloxyacetamido)-3-hydroxy-3-cephem-4-carboxylate.

21. The compound of claim 1, wherein R is hydrogen and $R_1$ is methyl.

22. The compound of claim 21, said compound being 7-amino-3-methoxy-3-cephem-4-carboxylic acid.

23. The compound of claim 21, said compound being p-nitrobenzyl 7-amino-3-methoxy-3-cephem-4-carboxylate.

24. The compound of claim 21, said compound being p-methoxybenzyl 7-amino-3-methoxy-3-cephem-4-carboxylate.

25. The compound of claim 1 wherein R and $R_1$ are both hydrogen.

26. The compound of claim 25, said compound being p-nitrobenzyl 7-amino-3-hydroxy-3-cephem-4-carboxylate.

27. The compound of claim 25, said compound being p-methoxybenzyl 7-amino-3-hydroxy-3-cephem-4-carboxylate.

28. The process for preparing a 3-hydroxy-3-cephem compound of the formula

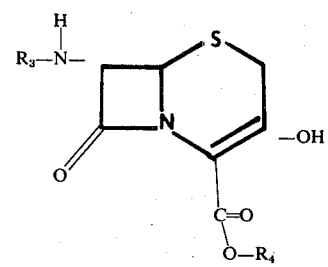

which comprises a. reacting with ozone in an inert solvent at a temperature between −80° and 0°C. a 3-exomethylenecepham compound of the formula

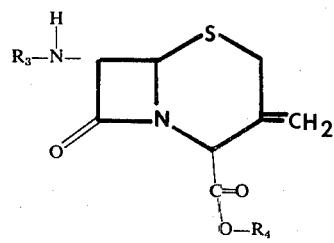

to obtain the intermediate ozonide;

b. adding to the reaction mixture maintained at −80° to 0°C. and containing said ozonide a reducing compound selected from the group consisting of sulfur dioxide, sodium bisulfite and trimethyl phosphite; and c. recovering said 3-hydroxy-3-cephem compound from said mixture;

where in the above formulae $R_4$ is a carboxylic acid protecting ester forming group; and $R_3$ is hydrogen, $C_2$-$C_7$ alkanoyl, cyanoacetyl, haloacetyl, 5'-protected amino-5'-protected carboxyvaleryl; or an acyl group of the formula

wherein R'' is phenyl, or phenyl substituted by halogen, hydroxy, nitro, amino, cyano, $C_1$-$C_4$ lower alkyl, $C_1$-$C_4$ lower alkoxy, hydroxymethyl, aminomethyl, carboxy or carboxymethyl;

or an arylalkanoyl group of the formula

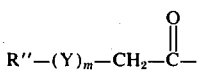

wherein R'' is as defined above,
Y is O or S, and
m is 0 or 1;
or a substituted arylalkanoyl group of the formula

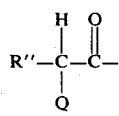

wherein
R' is as defined above and
Q is protected hydroxy.

29. The process of claim 28 wherein sulfur dioxide is added to the reaction mixture containing the ozonide.

30. The compound of claim 1 in the keto form of the formula

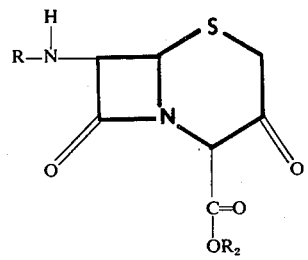

wherein $R_2$ is a carboxylic acid protecting ester forming group.

* * * * *

(Page one of three)

UNITED STATES PATENT AND TRADEMARK OFFICE
CERTIFICATE OF CORRECTION

PATENT NO. : 3,917,587
DATED : November 4, 1975
INVENTOR(S) : Robert R. Chauvette It is certified that error appears in the above-identified patent and that said Letters Patent are hereby corrected as shown below:

Column 3, line 9, "R'-(Y)-" should read -- $R'-(Y)_m-$ --, line 10, "m-CH$_2$-" should read -- -CH$_2$- --, line 25, "R'''λ" should read -R''''-CH$_2$- --, line 59, "4-methox-" should read -- 4-methoxy- --, line 60, "yphenyl" should read -- phenyl --;

Column 4, line 9, "p-methox-" should read -- p-methoxy- --, line 10, "ybenzyloxycarbonyl" should read -- benzyloxycarbonyl --, line 21, "fromed" should read --formed--;

Column 5, line 46, "R'λ" should read -- R'''-CH$_2$- --, line 47, "''-CH$_2$-" should be deleted, lines 56-61, the structural formula should appear as --  --;

Column 9, lines 36-44, that portion of both structural formulas appearing as

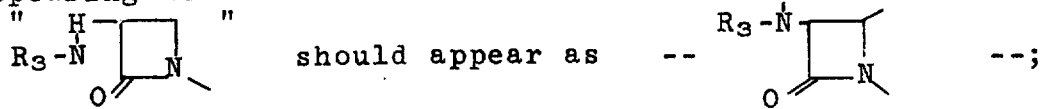     should appear as --  --;

Column 11, line 63, "7-(D-α-phenyl-α-formylox-" should read -- 7-(D-α-phenyl-α-formyloxy- --, line 64, "yacetamido)" should read -- acetamido --;

Column 16, line 63, "t-butylox-" should read -- t-butyloxy- --, line 64, "ycarbamido" should read -- carbamido --;

Column 17, line 53, "7-[2-(2thienyl)" should read -- 7-[2-(2-thienyl) --;

Column 18, line 47, "N-ethox-" should read -- N-ethoxy- --, line 48, "ycarbonyl" should read -- carbonyl --, line 58, "7-[2-(2-thienyl-" should read -- 7-[2-(2-thienyl)- --, line 59, ")acetamido]" should read -- acetamido] --, line 63, "7-phenox-" should read -- 7-phenoxy- --, line 64, "yacetamido" should read -- acetamido --;

(Page two of three)

UNITED STATES PATENT AND TRADEMARK OFFICE
CERTIFICATE OF CORRECTION

PATENT NO. : 3,917,587
DATED : November 4, 1975
INVENTOR(S) : Robert R. Chauvette It is certified that error appears in the above—identified patent and that said Letters Patent are hereby corrected as shown below:

Column 19, line 30, "5-carbox-" should read -- 5-carboxy- --, line 31, "yvaleramido)" should read -- valeramido) --, line 42, "carbox-" should read -- carboxy --, line 43, "yvaleramido)" should read -- valeramido) --, line 49 "carbox-" should read -- carboxy- --, line 50, "yvaleryl" should read -- valeryl --;

Column 20, line 16, "4-hydrox-" should read -- 4-hydroxy- --, line 17, "ymandelamido" should read -- mandelamido --;

Column 22, line 54, "7-phenox-" should read -- 7-phenoxy- --, line 55, "yacetamido" should read -- acetamido --;

Column 23, lines 15 and 16, "$\epsilon$" should appear as -- $\epsilon$ = --;

Column 24, line 29, "and;" should read -- and --;

Column 25, line 50, "7-phenox-" should read -- 7-phenoxy- --, line 51, "yacetamido" should read -- acetamido --;

Column 26, line 33, "5,53" should read -- 5.53 --;

Column 27, line 27, "7-[2-(2-thienyl-" should read -- 7-[2-(2-thienyl)- --, line 28, ")acetamido" should read -- acetamido --, line 56, "3,84" should read -- 3.84 --, line 66, "2,8" should read -- 2.8 --;

Column 28, line 34, "7-amino 3-" should read -- 7-amino-3- --;

Column 29, line 14, "$\epsilon$" should appear as -- $\epsilon$ = --, line 67, "7-[2-(2-thienyl-" should read -- 7-[2-(2-thienyl)- --;

Column 30, line 21, "$C_{7H}$" should read -- $C_7H$ --, line 24, "$\epsilon$" should appear as -- $\epsilon$ = --, and "$\sqcap$" should appear as -- $\epsilon$ = --, line 31, "7-phenox-" should read -- 7-phenoxy- --, line 32, "yacetamido" should read -- acetamido --, line 56, "7-pheno-" should read -- 7-phenoxy- --, line 57, "yacetamido" should read -- acetamido --;

Column 31, line 2, "7;3" should read -- 7:3 --, lines 15 and 16, "$\epsilon$" should appear -- $\epsilon$ = --, line 31, "Nujul" should read -- Nujol --, line 34, "6.10)" should read -- 6.10 --, line 38, "$\epsilon$" should appear as -- $\epsilon$ = --, line 49, "7-phenox-" should read -- 7-phenoxy - --, line 50, "yacetamido" should read -- acetamido --.

Column 33, line 25, "$\epsilon$" should appear as -- $\epsilon$ = --;

(Page three of three)

UNITED STATES PATENT AND TRADEMARK OFFICE
CERTIFICATE OF CORRECTION

PATENT NO. : 3,917,587
DATED : November 4, 1975
INVENTOR(S) : Robert R. Chauvette It is certified that error appears in the above-identified patent and that said Letters Patent are hereby corrected as shown below:

Column 34, lines 10 and 11, "∈" should appear as -- ϵ = --, line 41, "742" should read -- 7.42 --;
Column 35, line 10, "2.3" should read -- 2.3 g. --;
Column 36, line 34, "R''-(Y)-" should read -- R''-(Y)$_m$- --, line 35, "m-CH$_2$-" should read -- -CH$_2$- --, line 49, "R'''$\lambda$" should read -- R'''' -CH$_2$- --;
Column 37, line 29, "7--" should be deleted, line 30, "-mandelamido-3-D-mandelamido-" should read -- 7-D-mandelamido-3-methoxy- --;
Column 39, line 19, "R'" should read -- R'' --.

Signed and Sealed this

Ninth Day of November 1976

[SEAL]

Attest:

RUTH C. MASON
*Attesting Officer*

C. MARSHALL DANN
*Commissioner of Patents and Trademarks*

Notice of Adverse Decision in Interference

In Interference No. 99,580, involving Patent No. 3,917,587, R. R. Chauvette, CEPHALOSPORIN ETHERS, final judgment adverse to the patentee was rendered September 30, 1981, as to claim 30.

[*Official Gazette February 23, 1982.*]